United States Patent [19]
Fleischer, III et al.

[11] Patent Number: 5,592,541
[45] Date of Patent: Jan. 7, 1997

[54] APPARATUS AND METHOD FOR FORWARDING INCOMING CALLS

[75] Inventors: Harold C. Fleischer, III; Michael W. Boeckman; S. James Merin, all of St. Louis, Mo.

[73] Assignee: Southwestern Bell Technology Resources, Inc., St. Louis, Mo.

[21] Appl. No.: 455,024

[22] Filed: May 31, 1995

[51] Int. Cl.$^6$ .............................. H04M 3/54; H04M 3/42
[52] U.S. Cl. .......................... 379/211; 379/201; 379/207; 379/67; 379/221; 379/212; 379/219; 379/230; 379/220
[58] Field of Search ................................... 379/207, 230, 379/229, 242, 210, 211, 212, 243, 244, 245, 219, 220, 221, 201, 67, 88, 89

[56] References Cited

U.S. PATENT DOCUMENTS

| | | | |
|---|---|---|---|
| 4,191,860 | 3/1980 | Weber | 379/207 |
| 4,313,035 | 1/1982 | Jordan et al. | 379/201 |
| 4,611,094 | 9/1986 | Asmuth et al. | 379/207 |
| 4,611,096 | 9/1986 | Asmuth et al. | 379/207 |
| 4,756,020 | 7/1988 | Fodale | 379/127 |
| 4,757,267 | 7/1988 | Riskin | 379/201 |
| 4,788,718 | 11/1988 | McNabb et al. | 379/113 |
| 4,802,199 | 1/1989 | Lange et al. | 379/221 |
| 4,893,336 | 1/1990 | Wuthnow | 379/211 |
| 4,899,373 | 2/1990 | Lee et al. | 379/207 |
| 5,247,571 | 9/1993 | Kay et al. | 379/207 |
| 5,253,288 | 10/1993 | Frey et al. | 379/211 |
| 5,315,641 | 5/1994 | Montgomery et al. | 379/220 |
| 5,353,331 | 10/1994 | Emery et al. | 379/67 |
| 5,367,566 | 11/1994 | Moe et al. | 379/243 |
| 5,377,186 | 12/1994 | Wegner et al. | 379/211 |
| 5,384,831 | 1/1995 | Creswell et al. | 379/67 |
| 5,392,342 | 2/1995 | Roesnthanl | 379/211 |
| 5,436,957 | 7/1995 | McConnell | 379/88 |
| 5,440,620 | 8/1995 | Slusky | 379/211 |
| 5,448,633 | 9/1995 | Jamaleddin et al. | 379/201 |
| 5,469,500 | 11/1995 | Satter et al. | 379/201 |

OTHER PUBLICATIONS

"Class, Calling Name Delivery Generic Requirements FSD 01–02–1070," LATA Switching Systems Generic Requirements, Bell Communications Research, Technical Reference TR–NWT–001188, Issue 1 (Dec. 1991).

"Switching System Requirements for Call Control Using the Integrated Services Digital Network User Part Communications Research", Technical Reference TR–TSY–000317, Issue 2 (Jan. 1989).

"Class Feature: Selective Call Acceptance," Bell Communications Research, Technical Advisory TA–TSY–001034, Issue 1 (Apr. 1990).

"Class Feature: Distinctive Ringing/Call Waiting," Bell Communications Research, Technical Reference TR–TSY–000219, Issue 2 (Aug. 1988).

"Class Feature: Calling Number Delivery FSD–01–02–1051," Bell Communications Research, Technical Reference TR–TSY–000031, Issue 3 (Jan. 1990).

(List continued on next page.)

Primary Examiner—Krista M. Zele
Assistant Examiner—Parag Dharia
Attorney, Agent, or Firm—Greenblum & Bernstein P.L.C.

[57] ABSTRACT

An apparatus and method is provided for forwarding incoming calls by utilizing a subscriber defined routing list. The routing list may comprise alternate telephone numbers to which calls placed to the subscriber's number(s) will be routed. Subscribers may establish routing lists that allow incoming calls to be forwarded to other numbers for either all of their numbers or for selected groups of one or more numbers. Each group of numbers is identified by a unique group number. Incoming calls are forwarded according to a time-of-day or day-of-week, a percentage allocation, a specific date, an originating location of the calling party, or inputs by the calling party to prompts. Subscribers may use the group number to activate and configure forwarding options associated with subscriber numbers associated with the group.

33 Claims, 25 Drawing Sheets

OTHER PUBLICATIONS

"ISDN Call Forwarding," *Bell Communications Research, Technical Reference TR–TSY–000853, Issue 1 (Dec. 1988).*

"ISDN Call Forwarding, Revision 1," Bell Communications Research, Technical Reference TR–TSY–000853, Revision 1 (Dec. 1993).

"Generic Requirements for ISDN Automatic Recall," Bell Communications Research, Technical Reference TR–NWT–001199, Issue 1 (Feb. 1992).

"Class Feature: Automatic Recall FSD 01–02–1260," Bell Communications Research, Technical Reference TR–NWT–000227, Issue 3 (Jun. 1993).

"Class Feature: Automatic Callback FSD 01–02–1250" Bell Communications Research, Technical Reference TR–NWT–000215, Issue 3 (Jun. 1993).

"Class Feature: automatic Callback—Bulletin 1," Bell Communications Research, (Apr. 1995).

"Status of PIN's and Remote Access," Bell Communications Research, Technical Memorandum TM–INS–021336, May 29, 1992.

Berman, Roger K., and Brewster, John H., "Perspectives on the AIN Architecture," IEEE Communications Magazine, Feb. 1992, pp. 27–32.

ROUTING TABLE

| | DIALED NUMBER | OPTION 1 | OPTION 2 | OPTION 3 |
|---|---|---|---|---|
| GROUP NUMBER 1 { | NPA-NXX-XXX1 | NPA-NXX-XXX1 | NPA-NXX-XXX5 | NPA-NXX-XXX9 |
| | NPA-NXX-XXX2 | NPA-NXX-XXX2 | NPA-NXX-XXX6 | NPA-NXX-XX10 |
| GROUP NUMBER 1 { | NPA-NXX-XXX3 | NPA-NXX-XXX3 | NPA-NXX-XXX7 | NPA-NXX-XX11 |
| | NPA-NXX-XXX4 | NPA-NXX-XXX4 | NPA-NXX-XXX8 | NPA-NXX-XX12 |

FIG. 5B

ROUTING TABLE

| | DIALED NUMBER | OPTION 1 | OPTION 2 (M-F) | OPTION 2 (SA-SU) | OPTION 3 |
|---|---|---|---|---|---|
| GROUP NUMBER 1 { | NPA-NXX-XXX1 | NPA-NXX-XXX1 | NPA-NXX-XXX5 | NPA-NXX-XXX9 | NPA-NXX-XX13 |
| | NPA-NXX-XXX2 | NPA-NXX-XXX2 | NPA-NXX-XXX6 | NPA-NXX-XX10 | NPA-NXX-XX14 |
| GROUP NUMBER 2 { | NPA-NXX-XXX3 | NPA-NXX-XXX3 | NPA-NXX-XXX7 | NPA-NXX-XX11 | NPA-NXX-XX15 |
| | NPA-NXX-XXX4 | NPA-NXX-XXX4 | NPA-NXX-XXX8 | NPA-NXX-XX12 | NPA-NXX-XX16 |

FIG. 6B

ROUTING TABLE

| DIALED NUMBER | 9:00 - 16:59 | 17:00 - 1:59 | 2:00 8:59 |
|---|---|---|---|
| NPA-NXX-XXX1 | NPA-NXX-XXX1 | NPA-NXX-XXX5 | NPA-NXX-XXX9 |
| NPA-NXX-XXX2 | NPA-NXX-XXX2 | NPA-NXX-XXX6 | NPA-NXX-XX10 |
| NPA-NXX-XXX3 | NPA-NXX-XXX3 | NPA-NXX-XXX7 | NPA-NXX-XX11 |
| NPA-NXX-XXX4 | NPA-NXX-XXX4 | NPA-NXX-XXX8 | NPA-NXX-XX12 |

GROUP NUMBER 1 { NPA-NXX-XXX1, NPA-NXX-XXX2 }
GROUP NUMBER 2 { NPA-NXX-XXX3, NPA-NXX-XXX4 }

FIG. 7B

ROUTING TABLE

| DIALED NUMBER | M-F | SA-SU |
|---|---|---|
| NPA-NXX-XXX1 | NPA-NXX-XXX5 | NPA-NXX-XXX9 |
| NPA-NXX-XXX2 | NPA-NXX-XXX6 | NPA-NXX-XX10 |
| NPA-NXX-XXX3 | NPA-NXX-XXX7 | NPA-NXX-XX11 |
| NPA-NXX-XXX4 | NPA-NXX-XXX8 | NPA-NXX-XX12 |

GROUP NUMBER 1 { NPA-NXX-XXX1, NPA-NXX-XXX2 }
GROUP NUMBER 2 { NPA-NXX-XXX3, NPA-NXX-XXX4 }

FIG. 8B

ROUTING TABLE

| | DIALED NUMBER | DEC. 31 | JAN. 1 | JULY 4 | NOV. 28 |
|---|---|---|---|---|---|
| GROUP NUMBER 1 { | NPA-NXX-XXX1 | NPA-NXX-XXX1 | NPA-NXX-XXX5 | NPA-NXX-XXX9 | NPA-NXX-XX13 |
| | NPA-NXX-XXX2 | NPA-NXX-XXX2 | NPA-NXX-XXX6 | NPA-NXX-XX10 | NPA-NXX-XX14 |
| GROUP NUMBER 2 { | NPA-NXX-XXX3 | NPA-NXX-XXX3 | NPA-NXX-XXX7 | NPA-NXX-XX11 | NPA-NXX-XX15 |
| | NPA-NXX-XXX4 | NPA-NXX-XXX4 | NPA-NXX-XXX8 | NPA-NXX-XX12 | NPA-NXX-XX16 |

FIG. 9B

ROUTING TABLE

| DIALED NUMBER | 15% | 25% | 40% | 20% |
|---|---|---|---|---|
| GROUP NUMBER 1 { NPA-NXX-XXX1 | NPA-NXX-XXX1 | NPA-NXX-XXX5 | NPA-NXX-XXX9 | NPA-NXX-XX13 |
| NPA-NXX-XXX2 | NPA-NXX-XXX2 | NPA-NXX-XXX6 | NPA-NXX-XX10 | NPA-NXX-XX14 |
| GROUP NUMBER 2 { NPA-NXX-XXX3 | NPA-NXX-XXX3 | NPA-NXX-XXX7 | NPA-NXX-XX11 | NPA-NXX-XX15 |
| NPA-NXX-XXX4 | NPA-NXX-XXX4 | NPA-NXX-XXX8 | NPA-NXX-XX12 | NPA-NXX-XX16 |

FIG. 10B

ROUTING TABLE

| | DIALED NUMBER | NUMBER ON LIST | NUMBER NOT ON LIST |
|---|---|---|---|
| GROUP NUMBER 1 { | NPA-NXX-XXX1 | NPA-NXX-XXX1 | NPA-NXX-XXX5 |
| | NPA-NXX-XXX2 | NPA-NXX-XXX2 | NPA-NXX-XXX6 |
| GROUP NUMBER 2 { | NPA-NXX-XXX3 | NPA-NXX-XXX3 | NPA-NXX-XXX7 |
| | NPA-NXX-XXX4 | NPA-NXX-XXX4 | NPA-NXX-XXX8 |

FIG. 11B

SCREENING LIST

CALLER'S NUMBER

NPA-NXX-XX50
NPA-NXX-XX66
NPA-NXX-XX87
NPA-NXX-XX89
NPA-NXX-XX90
NPA-NXX-XX96
NPA-NXX-XX97
NPA-NXX-XX98
NPA-NXX-XX99
NPA-NXX-X100

FIG. 11C

APPARATUS AND METHOD FOR FORWARDING INCOMING CALLS

BACKGROUND OF THE INVENTION

1. Field of the Invention

The present invention generally relates to a telecommunications system that allows subscribers to define and tailor their telecommunication services based on their individual needs. More particularly, the present invention relates to an intelligent call forwarding apparatus and method for providing subscribers with the ability to forward incoming calls based on predetermined routing options.

2. Acronyms

The written description provided herein contains acronyms which refer to various communication services and system components. Although known, use of several of these acronyms is not strictly standardized in the art. For purposes of the written description herein, acronyms will be defined as follows:
Action Control Points (ACP)
Advanced Intelligent Network (AIN)
Central Office (CO)
Central Office Code (COC)
Common Channel Inter-Office Signaling (CCIS)
Common Channel Signaling (CCS)
Data and Reporting System (DRS)
Dual Tone Multiple Frequency (DTMF)
Integrated Service Control Point (ISCP)
Number Plan Area (NPA)
Plain Old Telephone Service (POTS)
Service Creation Environment (SCE)
Service Control Point (SCP)
Service Management System (SMS)
Service Switching Point (SSP)
Signaling Transfer Point (STP)
Transaction Capabilities Applications Protocol (TCAP).

3. Background Information

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between dispersed network locations, whereas the data messaging network is provided for controlling operations of the trunked communications network. An illustration of the basic components of an AIN architecture is shown in FIG. 18. As shown in FIG. 18, Central Offices (CO) 64–70 are provided for sending and receiving data messages from an Integrated Service Control Point (ISCP) 56 via Signaling Transfer Points (STP) 58–62. The data messages are communicated to and from the COs 64–70 and the ISCP 56 along a Common Channel Signaling (CCS) network 88. Each CO 64–70 serves as a network Service Switching Point (SSP) to route telephone calls between a calling station (e.g., station 72) and a called station (e.g., station 84) through the trunked communications network 90–92. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of features provided by the prior AIN or AIN-type intelligent networks relate to specialized call processing of incoming calls.

For example, U.S. Pat. No. 4,191,860, to WEBER, provides for special processing of calls, such as INward WATS (Wide Area Telephone Service) calls, via a number of local switching offices based on information stored in a central database. The central database is located at a remote Service Control Point (SCP). The local and toll offices of the telephone network compile a call data message via a CCIS link to the central database. The database at the SCP translates the dialed INWATS number into an unlisted destination telephone number based on an originating area code. The unlisted destination number is returned to the central offices via the CCIS link, and the call is completed. When the number of telephone calls to the unlisted number per unit time exceeds a threshold, the database instructs the telephone system to inhibit such calls from being connected for a predetermined period of time.

U.S. Pat. Nos. 4,611,094 and 4,611,096, both to ASMUTH et al., disclose a system for providing custom incoming telephone call processing services to a subscriber operating at many geographically diverse locations. A subscriber program stored in a central database is accessed to provide instructions to the SSPs to complete incoming calls to one of the subscriber locations in accordance with special services defined by the subscriber. The subscriber program controls the Action Control Points (ACP) to string together the desired call processing capabilities to process each call. Specified parameters stored in the program, such as time of day, caller location and data inputted by the caller, determine the final destination to which each call should be completed. The disclosures of ASMUTH et al. '094 and ASMUTH et al. '096 are expressly incorporated herein by reference in their entirety.

U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 4,757,267, to RISKIN, discloses routing of an "800-type" telephone call. The system identifies the caller's originating telephone number and initially routes the call to an office in the general vicinity of the caller. The office includes a vertical-horizontal (V-H) file listing dealers by product/service and equivalent latitude and longitude. The call is routed to the nearest dealer for the identified product or service based on a comparison of the called 800-number and the data in the V-H file. If the call cannot be completed to the nearest dealer, because the dealer's telephone is busy or the dealer does not answer, the call is routed to the next nearest dealer.

U.S. Pat. No. 4,899,373, to LEE et al., discloses a system to provide telephone services to a subscriber on a personal basis when the subscriber is away from his or her home base or office. A nationally accessible database, via the CCIS, stores the subscriber's feature data in association with a personal identification number (PIN). A subscriber wishing to use personalized features while away from a home base or office, dials a special code from a station connected to any exchange which has access to the database and enters a PIN.

The station then provides telephone service to the subscriber based on the subscriber's personalized telephone service.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located in a central location, such as an SCP. Service features are controlled by the central database and are changed by reprogramming the service logic located at the central database. A variety of service features are provided including extension number dialing and call transfer across groups of lines connected to different exchanges.

U.S. Pat. No. 5,353,331, to EMERY et al., discloses an AIN system which connects to, and controls processing of, calls to a subscriber's wireless handset via a home base station or wireless communication network. In response to calls directed to the subscriber's wireless handset, the AIN determines where the handset is located using a central database and routes the call to that location. The incoming call can be routed directly to the handset, blocked, or routed to an alternate termination point. In response to calls from the handset, the central database provides instruction data to the land line network to extend a requested special service to the subscriber.

Despite the teachings of these prior applications, subscribers of telecommunication services are still provided with only a limited ability to control call forwarding features of incoming calls. For example, in WEBER and RISKIN, subscribers are limited to forwarding only incoming "800-type" calls to a predetermined local telephone number. Subscribers are not provided with the ability to designate local telephone numbers or to designate local numbers as part of a group, which are forwarded to another local telephone number based on subscriber defined forwarding options. Prior applications also fail to provide subscribers with the ability to select among a plurality of call forwarding features. Further, while the disclosures of ASMUTH et al. '094 and ASMUTH et al. '096 teach call forwarding features, subscribers cannot identify groups of telephone numbers by group numbers that are utilized to implement and select call forwarding options. Prior attempts do not provide subscribers with the ability to activate call forwarding options by placing a single call, such that many telephone numbers (potentially several thousand) may be automatically forwarded to alternate locations.

Such features would be highly desirable to subscribers, such as large businesses, that have multiple telephone numbers and that are very dependent on maintaining their ability to answer client telephone calls effectively and efficiently. Large businesses, such as answering services, brokerage houses, banks, mortgage companies, catalog companies and hospitals, as well as government agencies, could benefit and maximize their resource management needs from such features. Further, the intelligent call forwarding features of the present invention could serve as part of a "disaster recovery" service, whereby incoming calls are redirected to other subscriber locations in the event of equipment failures, power outages, fire or other natural disasters.

SUMMARY OF THE INVENTION

In view of the foregoing, the present invention, through one or more of its various aspects, embodiments and/or specific features or sub-components thereof, is thus presented to bring about one or more objects and advantages, such as those specifically noted below.

A general object of the present invention is to provide an apparatus and method which allows subscribers to forward incoming telephone calls to a telephone number or network location specified on a subscriber defined routing list.

More particularly, an object of the present invention is to provide an apparatus and a method that provides subscribers with the ability to forward incoming telephone calls to multiple telephone numbers, en masse, based on predetermined options.

Another object of the present invention is to provide an apparatus and method for subscribers to forward incoming telephone calls based on the time-of-day the call is placed.

Still another object of the present invention is to provide an apparatus and method for subscribers to forward incoming telephone calls based on the day-of-week the call is placed.

Yet another object of the present invention is to provide an apparatus and method for subscribers to forward incoming telephone calls based on a specific date on which the call is placed.

Another object of the present invention is to provide an apparatus and method for subscribers to forward incoming telephone calls to different locations on a percentage allocation basis.

A further object of the present invention is to provide an apparatus and method for subscribers to forward incoming telephone calls based on the originating location from which call is placed.

Still another object of the present invention is to provide an apparatus and method for subscribers to forward incoming telephone calls based on commands entered by a calling party in response to predetermined voice prompts.

Yet another object of the present invention is to provide an apparatus and method for subscribers to selectively choose among a plurality of call forwarding options, including those specifically noted above.

Still another object of the present invention is to provide an apparatus and a method for subscribers to enter a personal identification number to update and change call forwarding options associated with their telephone number(s).

Still another object of the present invention is to provide an apparatus and a method to redirect calls to other subscriber locations to maximize resource utilization.

According to the present invention, an intelligent call forwarding system is provided for use in a communications network comprising a plurality of communication lines extending between dispersed network locations identified by a communication line number, and a plurality of service switching points for selectively interconnecting the communication lines in order establish a communication connection between at least two of the locations. The communication connection may be established in response to a service request by a caller located at one of the locations.

The intelligent call forwarding system includes an integrated service control point having a routing list for storing a plurality of subscriber communication line numbers and alternate routing options associated with each of the subscriber communication line numbers, and a group record for storing group numbers identifying predetermined groups of one or more subscriber communication line numbers and service logic associated with each of the group numbers. A signaling communications system is also provided for establishing two-way communication of data messages between the plurality of service switching points and the integrated service control point. The signaling communications system may comprise means for transmitting a query message from one of the plurality of service switching points to the integrated service control point in response to the service request from the caller to establish communication with the subscriber, wherein the query message includes a communication line number of the caller and a dialed subscriber communication line number.

The integrated service control point also includes means for accessing the group number and the associated service logic from the group record based on the dialed subscriber communication line number, means for retrieving one of the alternate routing options from the routing list based on the dialed subscriber communication line number and the service logic accessed by the accessing means, and means for instructing one of the service switching points, through the signaling communications system, to route the service request in accordance with the alternate routing option retrieved by the retrieving means.

According to another aspect of the present invention, a method of selectively forwarding incoming calls to a subscriber in a communications network is provided. The method includes the steps of: receiving, at a service switching point, a service request from the caller to establish a communications connection with the subscriber; suspending the service request at the service switching point and forwarding a query message to the integrated service control point, the query message including a communication line number of the caller and a dialed communication line number of the subscriber; accessing the group number and the associated service logic from the group record based on the dialed subscriber communication line number; retrieving one of the alternate routing options from the routing list based on the dialed subscriber communication line number and the accessed service logic; and, instructing the service switching point, through a signaling communications system, to route the service request in accordance with the retrieved alternate routing option.

According to yet another aspect of the present invention, a method of selectively updating a subscriber's group record in a communications network is provided. The method includes the steps of: prompting, from a service switching point, the subscriber for one of the group numbers and an access identification number; collecting the group number and the access identification number at the one of the service switching points; forwarding, through a signaling communications system, the group number and the access identification number from the service switching point to the integrated service control point; verifying, at the integrated service control point, the group number and the access identification number; thereafter, prompting the subscriber from the service switching point to select one of a plurality of update option requests, the update option requests comprising options to modify the group record; collecting a response entered by the subscriber at the service switching points and forwarding, through the signaling communications system, the response from the service switching point to the integrated service control point; and, updating, at the integrated service control point, the group record in accordance with the response.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIG. 5B is a routing table associated with the basic routing service feature according to the present invention;

FIG. 6B is a routing table associated with the basic routing service feature in combination with the day-of-week routing service feature according to the present invention;

FIG. 7B is a routing table associated with the time-of-day routing service feature according to the present invention;

FIG. 8B is a routing table associated with the day-of-week routing service feature according to the present invention;

FIG. 9B is a routing table associated with the specific date routing service feature according to the present invention;

FIG. 10B is a routing table associated with the percentage allocation routing service feature according to the present invention;

FIG. 11B is a routing table associated with the originating location routing service feature according to the present invention;

FIG. 11C is a screening list associated with the originating location routing service feature according to the present invention;

DETAILED DESCRIPTION OF THE ILLUSTRATED EMBODIMENTS

Figure 1:
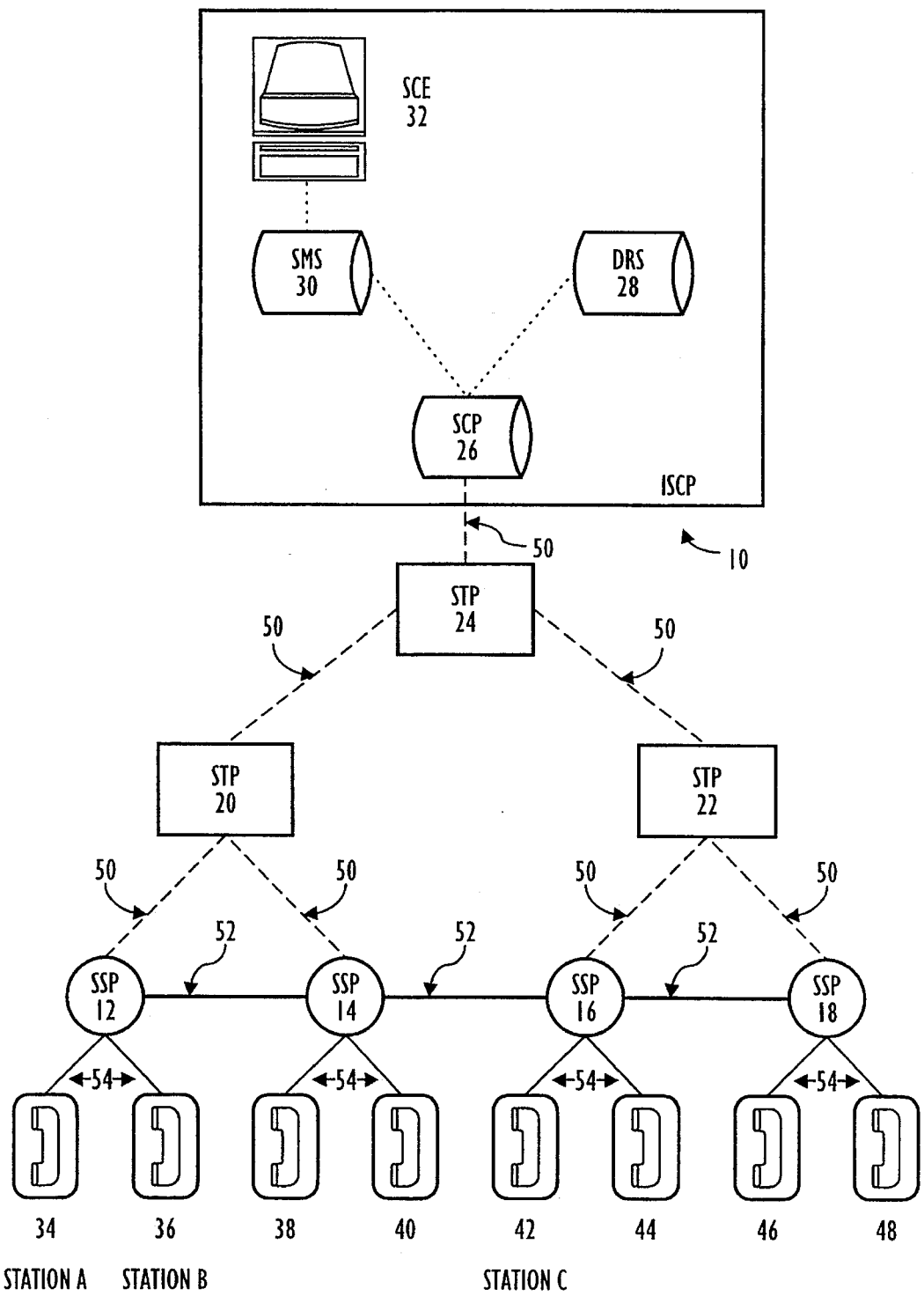
FIG. 1 illustrates, in a general block diagram form, an Advanced Intelligent Network system for implementing the intelligent call forwarding in accordance with the present invention.

Referring now to the accompanying drawings, FIG. 1 illustrates a general block diagram of an Advanced Intelligent Network (AIN) in which an apparatus and method for forwarding incoming calls is embodied in accordance with an aspect of the present invention. Many telephone services may be provided using an AIN or AIN-type network for centralized control of telephone services offered to subscribers, as opposed to localized control of services at the Central Office (CO). The AIN system is provided through interaction between switching points and other systems supporting AIN logic.

In FIG. 1, local telephone lines 54 connect individual telephone stations 34–48 in each geographic area to the closest Central Office (CO). In FIG. 1, each CO is shown as a Service Switching Point (SSP) 12, 14, 16 and 18. The SSPs may include, but are not limited to, 5ESS, 1AESS, and DMS-100 switches. If 5ESS switches are utilized, then these switches should be equipped with Generic 5E8 (or higher) and provided the necessary trigger requirements (discussed below) in order to serve subscribers. Any 1AESS switches should be equipped with Generic 1AE12.01 (or higher) and provided the necessary trigger requirements in order to serve subscribers. For DMS switches, BCS-35 or BCS-36 and the necessary trigger features should be provided.

For purposes of illustration, only four SSPs are shown in FIG. 1. However, more (or less) than four SSPs may be utilized. The SSP 12, 14, 16 and 18 is a programmable switch which: recognizes AIN-type calls; launches queries to an Integrated Service Control Point (ISCP) 10; and, receives commands and data from an ISCP 10 to further process and route AIN-type calls. When the SSP 12, 14, 16 or 18 is triggered by an AIN-type call, the SSP 12, 14, 16 or 18 formulates an AIN service request and responds to call processing instructions from the network element in which the AIN service logic resides. The AIN service logic may reside in a database at the Service Control Point (SCP) 26. The SSPs 12, 14, 16 and 18 are connected by trunked communication lines 52 which are used to connect and carry telecommunication signals, e.g., voice and/or data, from a calling party to a called party.

In FIG. 1, the SSPs 12, 14, 16 and 18 are equipped with Common Channel Signaling (CCS) capabilities, which provides for two-way communications of data messages between each SSP 12, 14 16 and 18 and the ISCP 10 via CCS links 50. The data messages are formatted in accordance with the Transaction Capabilities Applications Protocol (TCAP). As shown in FIG. 1, SSPs 12 and 14 are connected to a first local area Signal Transfer Point (STP) 20 by CCS links 50. SSPs 16 and 18 are connected by CCS links 50 to a second local area STP 22. The connections 50 to the STPs are for signaling purposes, and allow the SSPs to send and receive messages to and from the ISCP 10. Each of the STPs can be connected to a large number of other STPs. For purposes of illustration in FIG. 1, CCS links 50 connect local STPs 20 and 22 to a regional STP 24 and connect the regional STP 24 to the ISCP 10.

The ISCP 10 is an integrated system which includes a Service Management System (SMS) 30, a Data and Reporting System (DRS) 28, a programmable Service Control Point (SCP) 26, and a Service Creation Environment (SCE) 32. The SCE 32 is a terminal attached to the SMS 30 for programming the database in the SCP 26 which defines the services for each individual subscriber. The SCP 26 executes software-based service logic and returns call routing instructions to the SSPs. The SMS 30 and the DRS 28 compile calling information to be used for billing and administrative purposes. By way of example, the ISCP 10 may implemented with the Bellcore Integrated Service Control Point (ISCP), loaded with ISCP software Version 2.2, available from Bellcore, Murray Hill, N.J.

Figure 2:
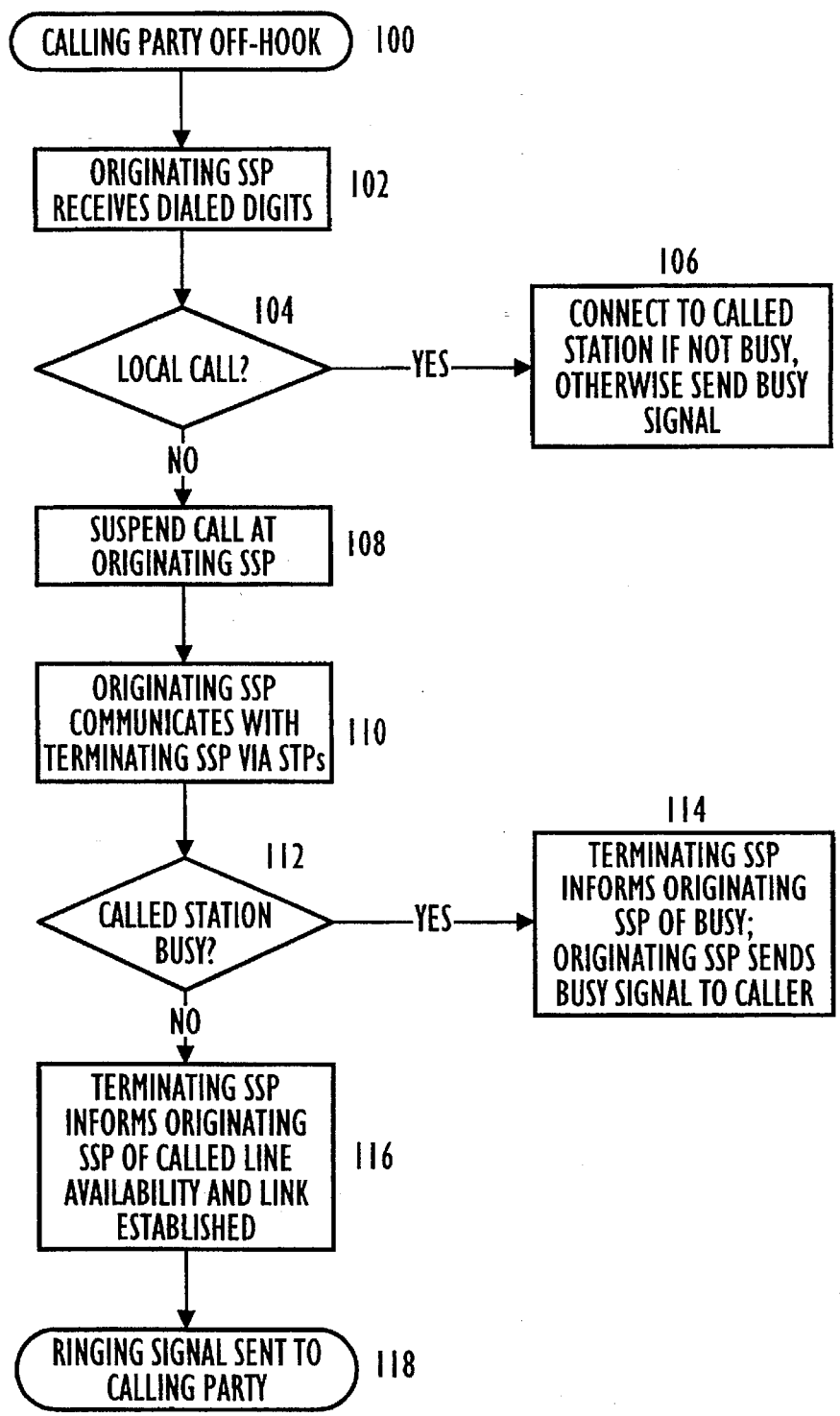
FIG. 2 is a flow chart illustrating normal call processing.

Referring to FIG. 2., normal call processing (for non-AIN calls) begins at step 100 when the calling station is off-hook and the SSP receives dialed digits from the calling station connected to the SSP through communication lines 54. When a caller at, for example, station A (see FIG. 1) places a call to a subscriber at, for example, station B or station C, the SSP (in this case SSP 12) suspends the call, receives and analyzes the digits at step 102 and determines the call type. If the SSP 12 determines at step 104 that the call from the caller is local, i.e., the calling and called stations are served directly by the same central office, then the call is connected from the calling station to the called station (or a busy signal is sent to the calling station) within one central office at step 106. If the calling station and the called station are within one central office, the call is processed within the central office and no external processing is required. However, when the called station, for example, station C in FIG. 1, is not connected to the same central office as the calling station (e.g., station A), further processing external from the caller's central office is necessary. In this situation, the SSP 12 determines at step 104 that the call is not local, i.e, the calling and called stations are not within the same central office, and, at step 108, the call is suspended and the SSP 12 sends a query message to the terminating SSP through one or more of the STPs 20, 22 and 24 via the CCS links 50. At step 110, the query message is routed to the terminating SSP 16, to which the called party station C is connected, so that the originating SSP 12 may query the terminating SSP 16 as to the status of the called station C. The status of the called station is determined by the terminating SSP at step 112. If, for example, the called station C is busy, the terminating SSP 16 at step 114 informs the originating station SSP 12 of that condition by sending a busy signal message via the STPs 20, 22 and 24 and CCS links 50. The originating SSP 12 then provides a busy signal to the caller at station A. If, on the other hand, the called station C is not busy, then at step 116, the terminating SSP 16 sends a ringback signal message to the originating SSP 12. A communication link is then established between the calling party at station A and the called party at station C. Such a communication link may be established by serially connecting the parties through trunked communication lines 52 and SSP 14. After the link has been established, a ringing signal is sent to the calling station A at step 118. Normal call processing proceeds, thereafter, based on whether the called party accepts the call and the status of the call (hold, routed, terminated, etc.).

Figure 3:
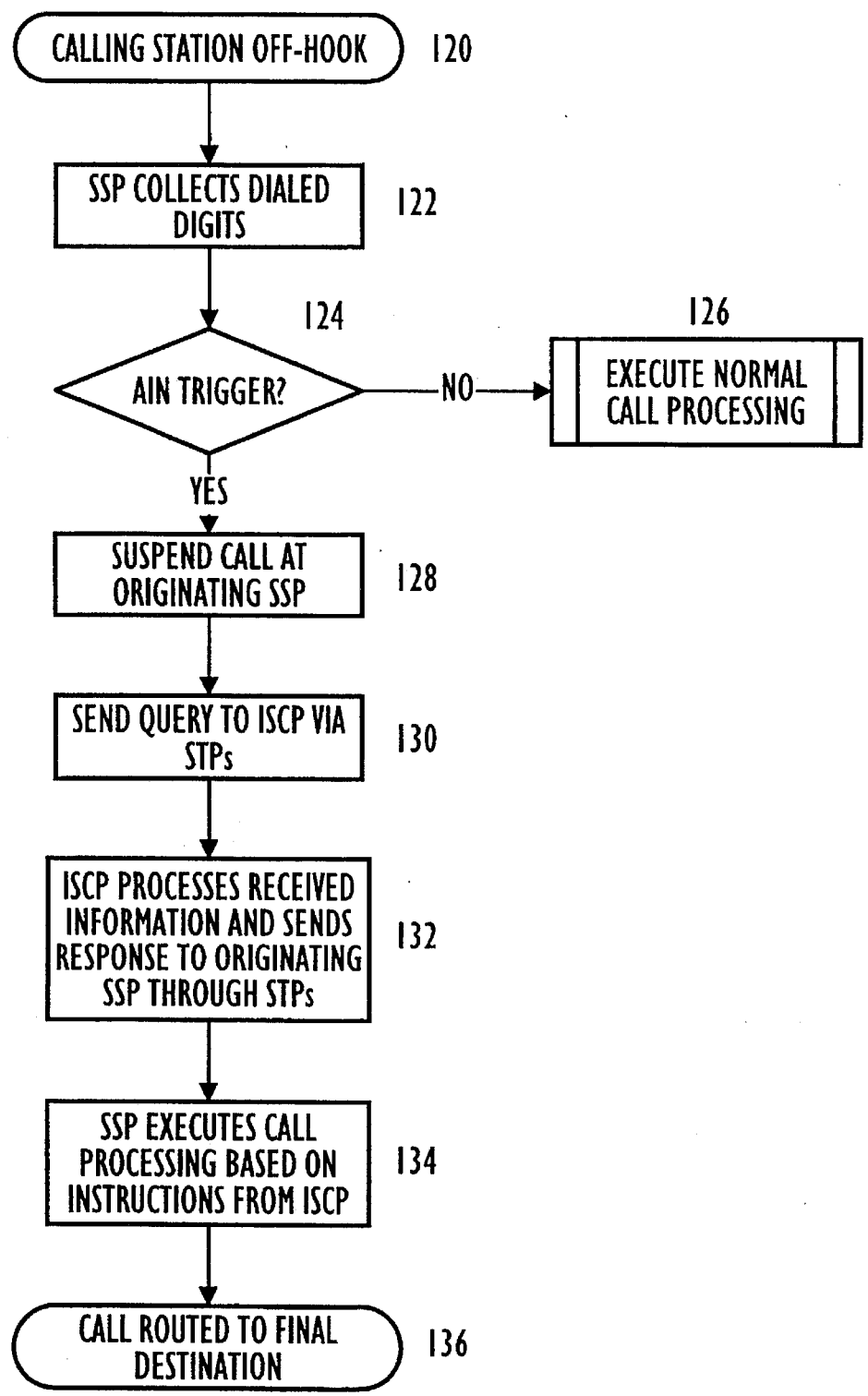
FIG. 3 is a flow chart illustrating AIN-type call processing.

As shown in FIG. 3, AIN call processing differs from call processing for a standard call. In AIN-type call processing, the SSP is responsible for: identifying the calls associated with AIN services; detecting when conditions for AIN service involvement are met; formulating service requests for call processing instructions; and, responding to the instructions received. For example, when a caller at station A (see FIG. 1) goes off-hook at step 120 and places a call originating on SSP 12, the SSP 12 at step 122 collects and analyzes the dialed digits. At step 124, the originating SSP 12 determines whether AIN processing is required based on the dialed digits and the detection of an AIN trigger (e.g., a 3/6/10D type trigger or a Terminating Attempt Trigger for 5ESS and DMS switches, or a Dialed Number trigger for a 1AESS switch).

If the originating SSP is incapable of recognizing the AIN trigger in an efficient manner (e.g., due to processing limitations), then the AIN system may be configured so that terminating SSP is utilized to recognize AIN triggers. In such a case, the originating SSP will suspend the call and query the terminating SSP in response to a service request by the calling party, and the terminating SSP will recognize the AIN trigger based on the dialed number (i.e., the subscriber's number).

If an AIN trigger is encountered, i.e., a call requiring AIN service involvement, the SSP 12 suspends the call at step 128. If an AIN trigger is not encountered, then at step 126 normal call processing is completed in accordance with FIG. 2.

At step 130, after the call has been suspended, the originating SSP 12 (or the terminating SSP 16) queries the ISCP 10 through the STPs 20 and 24 and the CCS links 50. The query messages that are sent to the ISCP 10 are provided in the TCAP format and identify the calling station and the digits dialed. The query messages further include billing information. At step 132, the ISCP 10 processes the received information and retrieves from a subscriber database (e.g., provided in the SCP 26) the call routing information associated with a particular subscriber's service logic. The query message is utilized to access information from the ISCP 10 regarding the particular services and processing to be provided for the call. The ISCP 10 formulates a response, again in the TCAP format, and transmits the response message back to the originating SSP 12 through the STPs 20 and 24. The response may include instructions for the originating SSP 12 on how to process and connect the call. At step 134, the originating SSP 12 executes call processing and provides service based on the information received from the ISCP 10. Thereafter, the call is routed to its final destination at step 136. Although the ISCP 10 is described herein as performing various functions, such as call processing and storing information regarding subscriber services, it is possible for these functions to be performed in an SCP 26 or another equivalent control point. Accordingly, operations disclosed herein as performed at an ISCP 10 may be similarly performed at an SCP 26.

Figure 4:
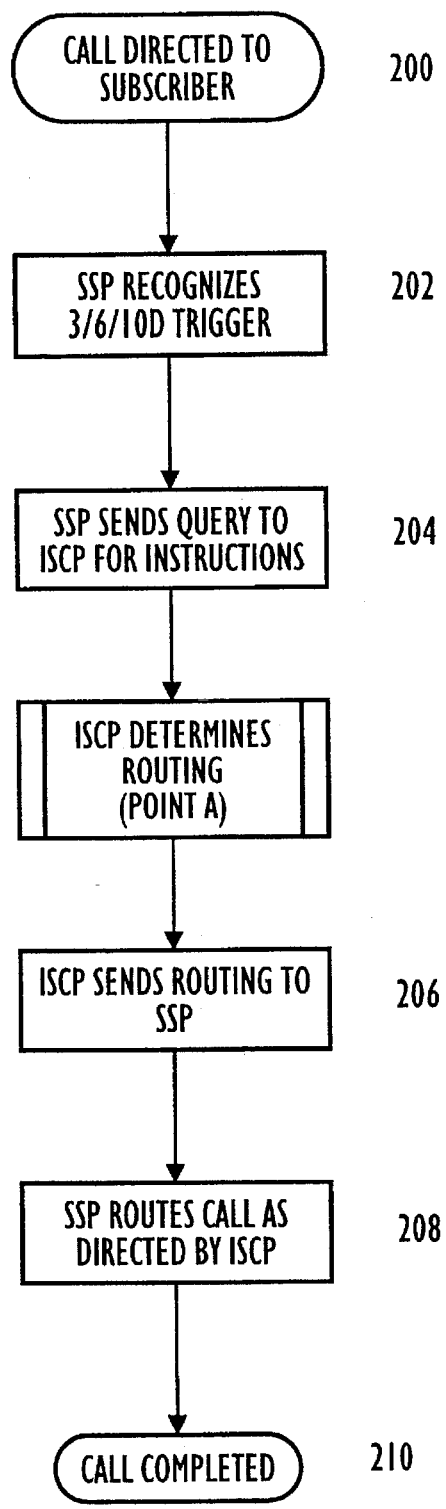
FIG. 4 is a high-level flow chart depicting the service logic for processing a telephone placed to a subscriber in accordance with the present invention.

Referring now to FIG. 4, there is illustrated a high-level flow chart depicting the service logic to process a call according to the present invention. At step 200, a call or service request is placed by a caller who goes off-hook and dials a subscriber's telephone number. For the purposes of this description, the subscriber's telephone may be located at station C connected to SSP 16 and the calling party may be located at station A (see FIG. 1). In addition, the destination SSP 16 will be utilized for recognizing the AIN trigger instead of the originating SSP 12. In such a case, the originating SSP 12 will connect the call in response to the service request to the terminating SSP 16.

At step 202, the terminating SSP 16, which is connected to the subscriber through communication lines 54, recognizes the AIN trigger based on the dialed subscriber telephone number forwarded with the connect message from the originating SSP 12. At step 204, in response to the trigger, the SSP 16 generates and sends a query message to the ISCP 10 for instructions as to how to route the call.

Although in the embodiment of FIG. 4 the destination SSP is utilized to detect the AIN trigger and query the ISCP 10 for call processing instructions, it is possible for every SSP to recognize triggers since queries are sent along CCS links 50, and all AIN equipped SSPs are connected to the CCS links 50, however, it is not practical to equip all SSPs with triggers for all possible communication line numbers.

As shown in FIG. 4, the ISCP 10 determines the call routing at point A in response to receipt of the query message. The query message may include the originating telephone number of the calling party and the destination number of the subscriber. Based on the service logic stored in the database of the SCP 26, the ISCP 10 determines the call routing which is associated with the subscriber. At step 206, the ISCP 10 returns call routing instructions which include numbers identifying communication lines 54 and/or trunked communication lines 52 from the SSP 16. Thereafter, the SSP 16 routes and complete the call at steps 208 and 210.

The service logic stored in the database of the SCP 26 determines how calls are to be forwarded. As discussed more fully below, the service logic defines the intelligent call forwarding features of the present invention and is customized/defined to suit the subscriber's needs.

There are several features according to the present invention which determine the ultimate disposition of a call directed by a caller to a subscriber. The first feature includes a subscriber defined routing table which may be stored in the database of SCP 26. The routing table comprises a plurality of subscriber telephone numbers that are each associated with one or more alternate telephone numbers. The alternate telephone numbers are utilized to designate a telephone number to which incoming calls to a subscriber's telephone numbers are routed. This feature will be hereinafter referred to as the basic routing service feature. The basic routing service feature may provide three separate routing options which are selectively activated by the subscriber to forward incoming calls.

A second routing feature of the present invention is call forwarding based on the time-of-day and/or day-of-week the incoming call is placed to the subscriber's telephone. In accordance with this feature, the subscriber defines a list of predetermined times-of-day and/or days-of-week during which incoming calls to one or more of the subscriber telephone numbers are forwarded to predetermined alternate telephone numbers. A third feature provides the subscriber with the ability to forward calls placed on a specific date to one or more of the subscriber's telephone numbers to a predetermined alternate telephone number. A fourth routing feature of the present invention forwards a predetermined percentage of the incoming telephone calls to one or more predetermined alternate telephone numbers defined by the subscriber. This feature can be used as a resource allocation tool to distribute incoming calls to one or more geographically dispersed locations.

A fifth feature of the present invention allows the subscriber to screen and forward incoming telephone calls based on the calling party's telephone number. The calling party's telephone number is compared with a subscriber defined screening list containing telephone numbers. Incoming calls are forwarded to a first predetermined alternate telephone number if the incoming call originates from a telephone number on the screening list, otherwise the incoming call is forwarded to a second predetermined alternate telephone number. The first alternate telephone number may be the originally dialed subscriber's number or any other number. A sixth feature of the invention provides a set of voice prompts, defined by the subscriber, to the caller so that final routing of the incoming call is determined by the caller's responses to the prompts. The calls are routed either to a predetermined telephone number or to trunked number as defined by the subscriber.

The above-noted routing features may apply to one or more groups of one or more subscriber telephone numbers. According to an aspect of the present invention, subscribers may designate one or more subscriber telephone numbers by a group number. Designated groups of telephone numbers may be stored at the ISCP (e.g., a database of the SCP 26)

as part of a group record. The group record may comprise group numbers designating each of the groups of subscriber telephone numbers and the service logic associated with each of the groups. Through a predetermined process (discussed below with reference to FIGS. 12–17), the subscriber can use the group number to potentially change forwarding features for a large number of subscriber telephone numbers. For example, if the subscriber has 10,000 telephone lines, the subscriber may designate 10 group numbers for ten different groups of 1000 telephone lines. Each of the ten groups may have a unique group number, which may be ten digits. Further, each of the 10 groups may have a different feature (as described above) associated with it. In accordance with another aspect of the invention, the subscriber may also define each group to have more than one of the above features operating in combination. According to this example, the subscriber will only need 10 group numbers to change the features associated with the subscriber's 10,000 telephone lines.

As shown in FIGS. 5B and 6B, the subscriber may define a routing table to determine call processing for incoming calls to the subscriber's telephone number(s). The routing table may be stored in the database of SCP 26. The routing table may comprise a plurality of dialed numbers (i.e., the subscriber's telephone numbers) that are each associated with one or more alternate telephone numbers serving as routing options. The entries in the routing table may be 10-digit telephone numbers in a NPA-NXX-XXXX format, where NPA is the Number Plan Area, or the area code, NXX is the Central Office Code, and XXXX is the customer line. The ISCP 10 determines from the routing tables where to instruct the SSPs to forward incoming telephone calls placed to the subscriber's telephone number.

In accordance with an aspect of the present invention, the subscriber may also define group numbers to be associated with predetermined groups of the subscriber's telephone numbers defined in the routing table. Such group numbers may be stored as part of a mapping or look-up table stored in the database of SCP 26. The subscriber may define particular routing features for each of the group, such that the ISCP 10 will instruct the SSPs to route incoming telephone calls based on the alternate numbers provided in the routing table and the particular routing feature defined for the group associated with the subscriber's telephone number that was dialed.

To describe the process by which telephone calls placed to a subscriber are routed, reference will now be made to FIGS. 5A–11A which illustrate several exemplary routing features of the present invention for forwarding incoming calls. FIGS. 5A–11A depict the logic flow of processing of an incoming call, which would occur at point A in FIG. 4, associated with the basic routing service feature hereinbefore described. As discussed above, at step 204 of FIG. 4, the SSP sends a query to the ISCP 10 requesting routing instructions after it has encountered an AIN trigger. At point A, the subscriber forwarding feature is then determined by the ISCP 10 in response to the query by SSP at step 204.

Figure 5A:
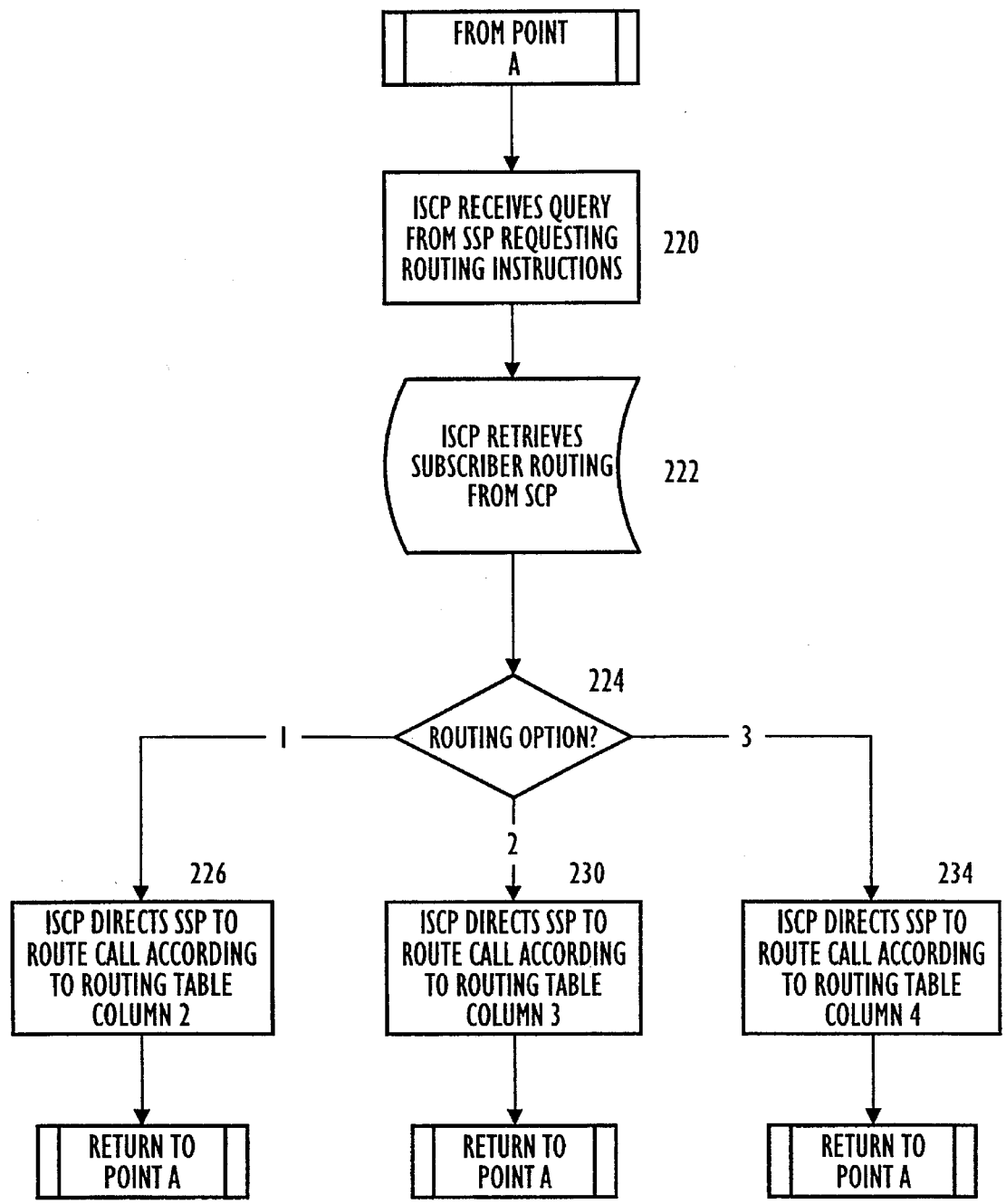
FIG. 5A is a flow chart illustrating the basic routing service feature according to the present invention.

Referring now to FIGS. 5A and 5B, an embodiment of the basic routing service feature of the present invention will be discussed.

As shown in FIG. 5B, the subscriber routing table may have three routing or forwarding options; however, the subscriber routing table may have many routing options associated with each subscriber's telephone number. The routing table may be stored in the database of the SCP 26 and, in general, comprises a plurality of dialed numbers (i.e., the subscriber's telephone numbers) that are associated with one or more alternate telephone numbers serving as routing options. In the routing table of FIG. 5B, the first column contains the subscriber's telephone numbers. The second, third and fourth columns contain the subscriber defined alternate numbers to which a call to the associated subscriber's telephone number listed in the first column will be routed in accordance with the routing option that is selected. The subscriber activates one of the three routing options through a predetermined procedure (discussed below).

In accordance with the embodiment of FIGS. 5A and 5B, activation of Option 1 causes an incoming telephone call to be passed through to the originally dialed telephone number. That is, the service request from the calling party to establish a communication connection with the dialed subscriber's telephone number is granted. Activation of Option 2 will cause the calling party's service request to be routed to a first alternate routing number defined for the subscriber's telephone number. Lastly, activation of Option 3 will cause the service request to be forwarded to a second alternate routing number for the defined dialed number. Although Option 1 may be used to pass the incoming call to the originally dialed subscriber telephone number, Options 2 or 3 may be used for the same purpose. In addition, the routing numbers of Options 1, 2 and 3 may each be defined such that the service request is forwarded to a location other than the originally dialed subscriber telephone number.

Referring now to FIG. 5A, at step 220, the ISCP 10 receives a query message from the SSP (e.g., the terminating SSP 16), and retrieves the subscriber's routing service feature from the database of the SCP 26 at step 222. If, for example, the service logic of the subscriber's telephone numbers are arranged by group, then the dialed number may be used to locate the subscriber's group logic record at step 222. In such a case, the group record is accessed at the ISCP 10, so that the routing of the incoming call may be determined based on the group service logic and the routing table.

Because, in this example, the subscriber has chosen the basic routing service feature, the ISCP 10 at step 224 determines which routing option is currently active to forward incoming calls. The routing option is selected by the subscriber by a predetermined process, which is discussed more fully below.

If the subscriber has Option 1 active, the ISCP 10 at step 226 directs the SSP 16 to route the call in accordance with the number in column 2 of the routing table (see FIG. 5B). The call is then connected to the alternate telephone number by the appropriate SSP in accordance with steps 206–210 in FIG. 4. In this example, a call placed to NPA-NXX-XXX3 would be routed to NPA-NXX-XXX3 (i.e., the originally dialed subscriber telephone number).

If the subscriber has Option 2 active, the ISCP 10 at step 230 directs the SSP 16 to route the call in accordance with alternate routing number in column 3 of the routing table. As a result, the call will be connected to the alternate telephone number by the appropriate SSP in accordance with steps 206–210 in FIG. 4. In this example, a call placed to NPA-NXX-XXX3 would be routed to NPA-NXX-XXX7.

If the subscriber has Option 3 active, the ISCP 10 at step 234 instructs the SSP 16 to route the call in accordance with the alternate routing number in column 4 of the routing table. The call is then connected to the alternate telephone number by the appropriate SSP in accordance with steps 206–210 in FIG. 4. In this example, a call placed to NPA-NXX-XXX3 would be routed to NPA-NXX-XX11.

Figure 6A:
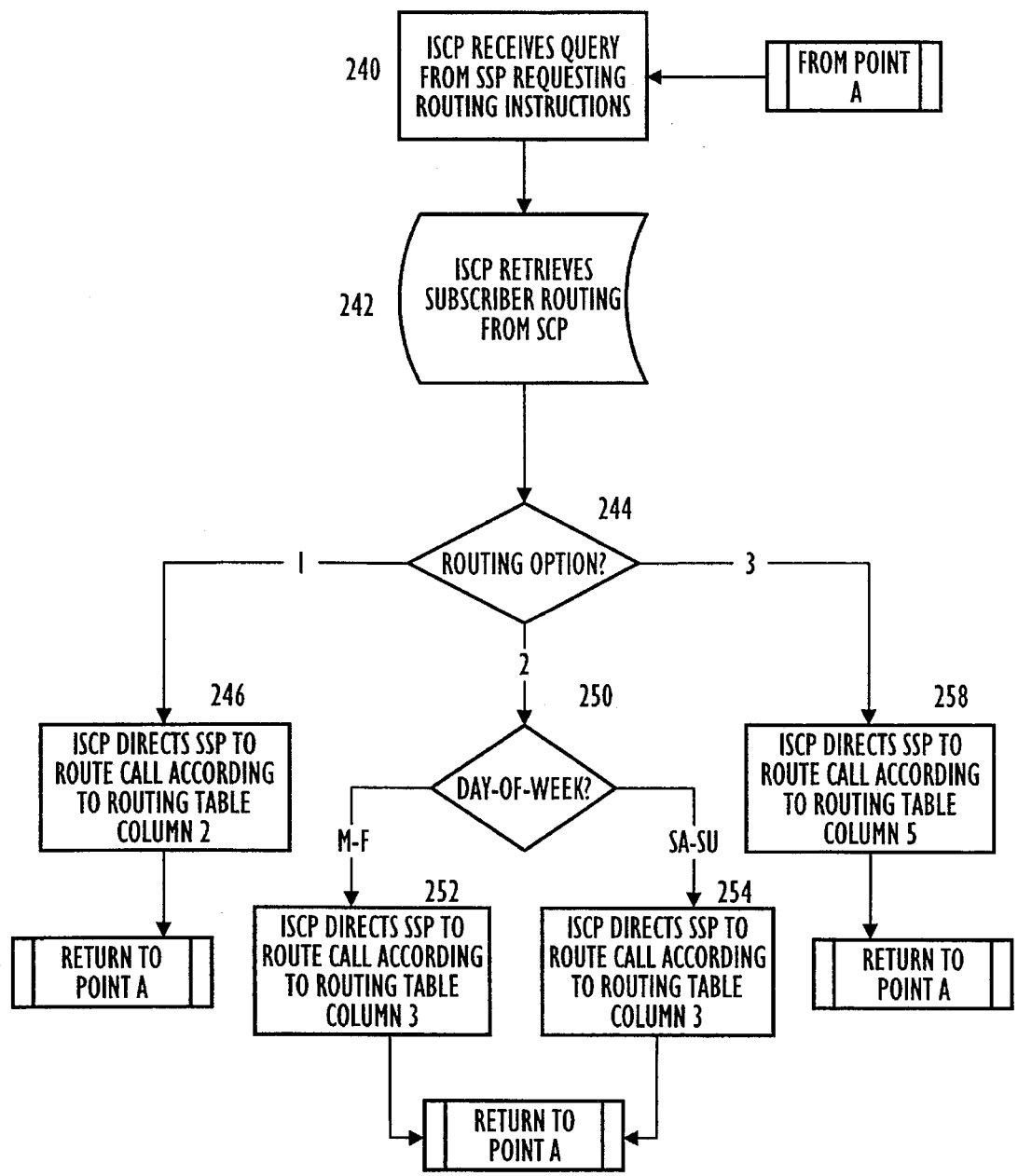
FIG. 6A is a flow chart illustrating the basic routing service feature in combination with the day-of-week routing service feature of the present invention.

FIGS. 6A and 6B illustrate another aspect of the present invention, in which the basic routing service feature is combined with the day-of-week routing feature. Although such a combination is specifically discussed herein, it is also possible to combine the basic routing service feature with any of the other routing features discussed above, including the time-of-day or specific date routing features.

According to the exemplary routing table of FIG. 6B, Option 1 routes the incoming telephone call to the originally dialed number, Option 2 routes calls to two different sets of alternate telephone numbers according to the day-of-week the call is placed, and Option 3 defines another alternate routing of incoming telephone calls.

As in the previous example, when the ISCP 10 receives a query from the SSP 16 at step 240, the ISCP 10 retrieves the subscriber's routing service feature from the database of the SCP 26 at step 242. If, for example, the service logic of the subscriber's telephone numbers are arranged by group (e.g., Group 1 and Group 2), then the dialed number may be used to locate the subscriber's group logic record at step 242. In such a case, the group record is accessed at the ISCP 10, so that the routing of the incoming call may be determined based on the group service logic and the routing table. Because the subscriber has selected the basic routing service feature, the ISCP 10 at step 244 determines which routing option is currently active to forward incoming calls. If the subscriber has Option 1 active, the ISCP 10 at step 246 directs the SSP 16 to route the call in accordance with the number in column 2 of the routing table. That is, the call is connected to the telephone number in column 2 by the appropriate SSP in accordance with steps 206–210 in FIG. 4. In this example, a call placed to NPA-NXX-XXX3 would be routed to NPA-NXX-XXX3 (i.e., the originally dialed subscriber telephone number).

If the subscriber has Option 2 active, the ISCP 10 at step 250 determines what day of the week the call was placed on. For this purpose, the ISCP 10 may be provided with an internal clock (not shown) for keeping track of the date on which the call was placed. The call is then routed based on the determined day-of-week. For example, if the call is placed on Monday through Friday, the ISCP 10 at step 252 may direct the SSP 16 to route the call in accordance with column 3 of the routing table. That is, the call is connected to the alternate telephone number defined in column 3 for the dialed number by the appropriate SSP in accordance with steps 206–210 in FIG. 4. In the routing table of FIG. 6B, a call placed to NPA-NXX-XXX3 would be routed to NPA-NXX-XXX7. If the call is placed on a Saturday or Sunday, the ISCP 10 at step 254 instructs the SSP 16 to route the call in accordance with the alternate number defined in column 4 of the routing table. As a result, the call is connected to the alternate telephone number by the appropriate SSP in accordance with steps 206–210 in FIG. 4. In the example of FIG. 6B, a call placed to NPA-NXX-XXX3 would be routed to NPA-NXX-XX11.

If the subscriber has Option 3 active, the ISCP 10 at step 258 directs the SSP 16 to route the call in accordance with the number defined in column 5 of the routing table. The call is then connected to the alternate telephone number defined in column 5 for the dialed number by the appropriate SSP in accordance with steps 206–210 in FIG. 4. For example, for the routing table of FIG. 6B, a call placed to NPA-NXX-XXX3 would be routed to NPA-NXX-XX15.

Figure 7A:
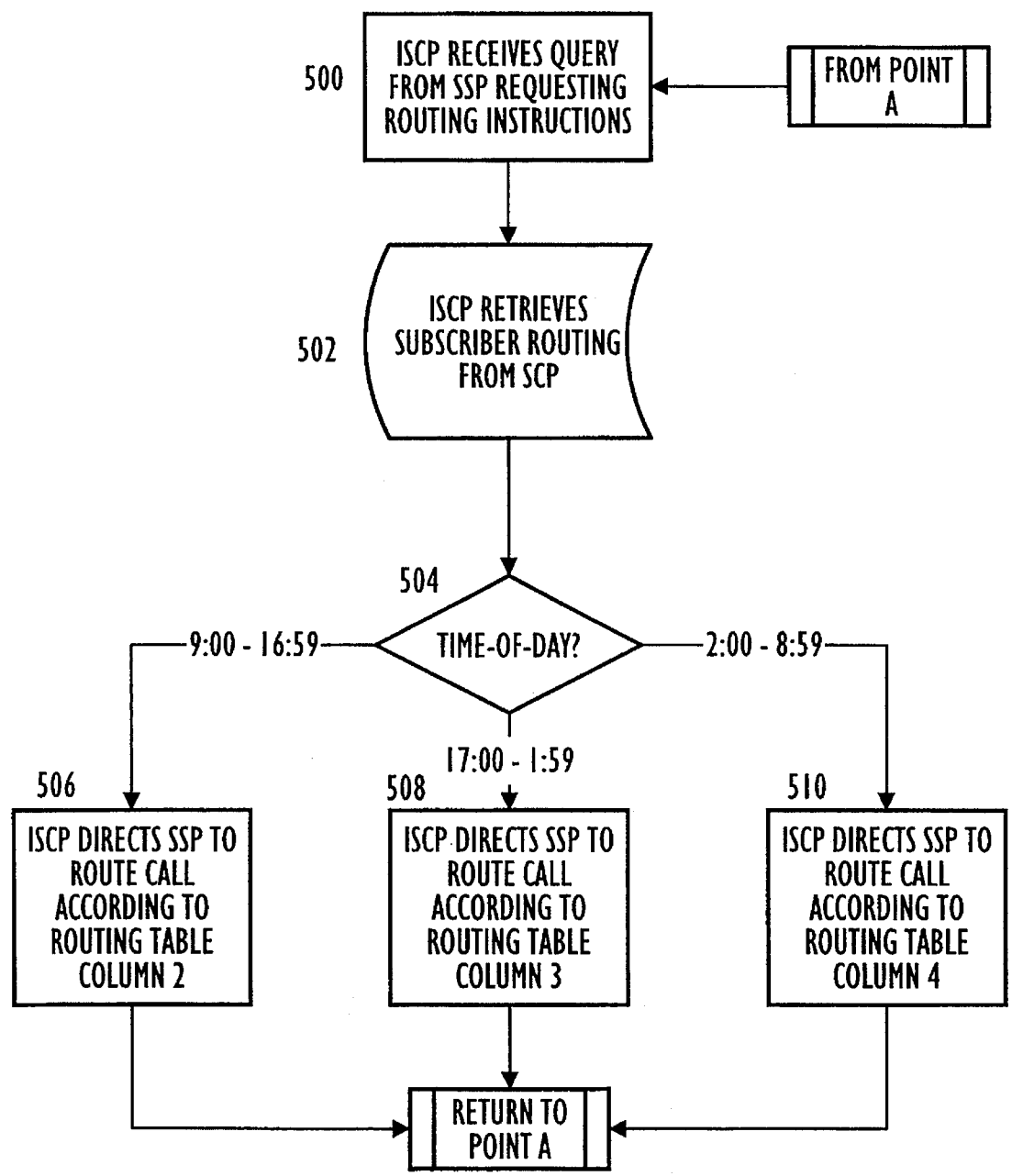
FIG. 7A is a flow chart illustrating the time-of-day routing service feature according to the present invention.

Referring now to FIGS. 7A and 7B, an embodiment of the time-of-day forwarding feature of the present invention will be discussed. As shown in FIG. 7B, the subscriber routing table may have three routing options based on the time-of-day the call is placed to the subscriber's number; however, the subscriber routing table may have fewer or more than three routing options associated with each subscriber's telephone number. The routing table may be stored in the database of the SCP 26 and, in general, comprises a plurality of dialed numbers (i.e., the subscriber's telephone numbers) that are associated with one or more alternate telephone numbers serving as forwarding or routing options. In the routing table of FIG. 7B, the first column contains the subscriber's telephone numbers. The second, third and fourth columns contain the subscriber defined alternate numbers to which a call to the associated subscriber's telephone number listed in the first column will be routed in accordance with the time-of-day that the call is placed.

Referring now to FIG. 7A, when the ISCP 10 receives a query from the SSP at step 500 (from Point A in FIG. 4), the ISCP 10 retrieves the subscriber's routing service feature from the database of the SCP 26 at step 502. If the service logic of the subscriber's telephone numbers are arranged by group, then the dialed number may be used to locate the subscriber's group logic record at step 502. In such a case, the group record is accessed at the ISCP 10, so that the routing of the incoming call may be determined based on the group service logic and the routing table. The ISCP 10 at step 504 determines the time-of-day and routes the incoming call to an alternate number in the routing table based on the time-of-day routing options defined by the subscriber. The subscriber may specify different routing numbers for particular periods or times of the day. According to the example of FIG. 7A, if the ISCP 10 at step 504 determines the incoming call was placed between 9:00 and 16:59, the ISCP 10 at step 506 directs the SSP to route the call to an associated alternate number in column 2 of the routing table in FIG. 7B. If the ISCP 10 at step 504 determines the incoming call was placed between 17:00 and 1:59, the ISCP 10 at step 508 directs the SSP 16 to route the call to an associated alternate number in column 3 of the routing table in FIG. 7B. If the ISCP 10 at step 504 determines the incoming call was placed between 2:00 and 8:59, the ISCP 10 at step 510 directs the SSP to route the call to an associated alternate number in column 4 of the routing table in FIG. 7B. In this example, a call placed to NPA-NXX-XXX3 at 18:00 would be routed to NPA-NXX-XXX7 by the appropriate SSPs.

Figure 8A:
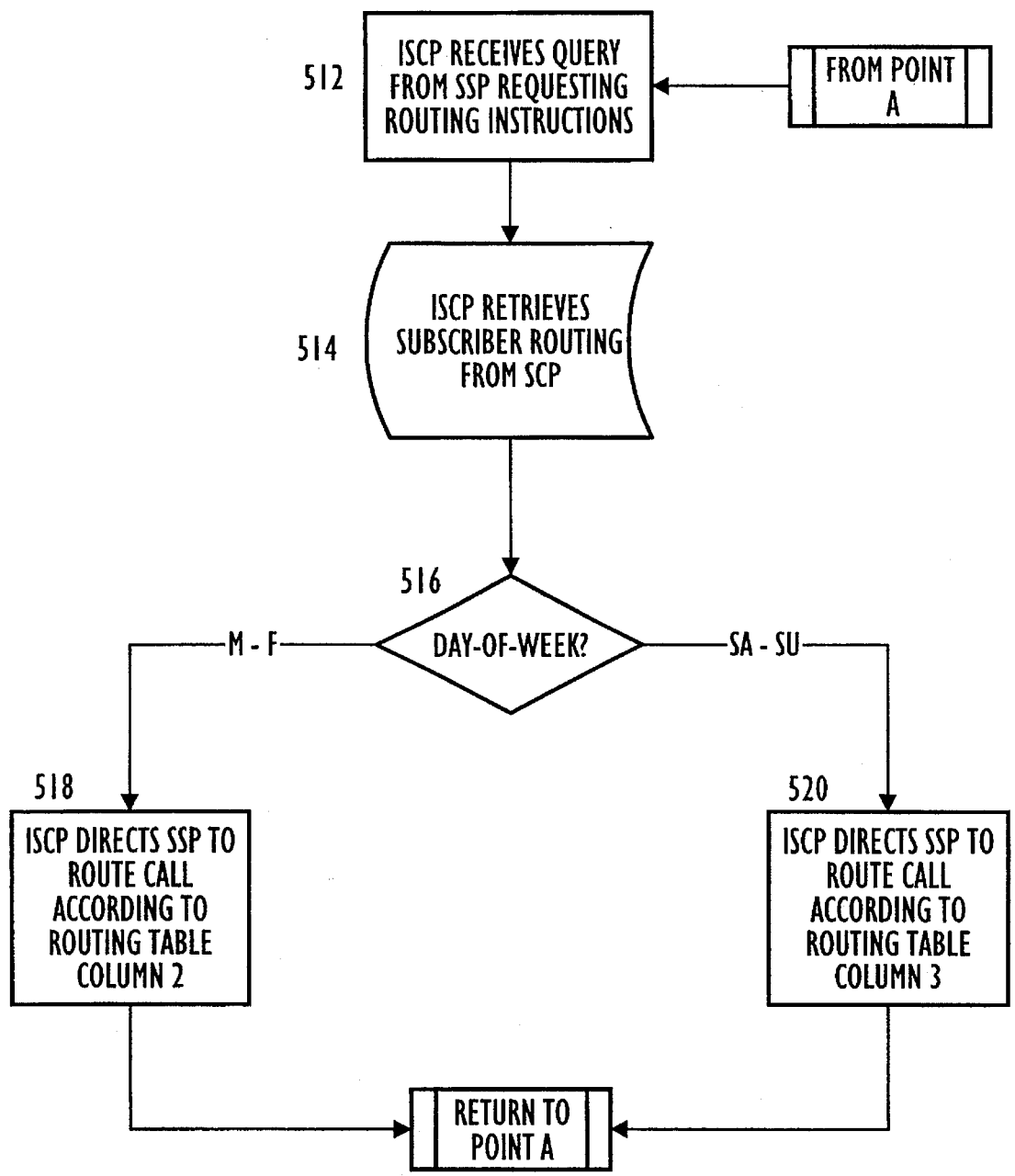
FIG. 8A is a flow chart illustrating the day-of-week routing service feature according to the present invention.

Referring now to FIGS. 8A and 8B, an embodiment of the day-of-week routing feature of the present invention will be discussed. As shown in FIG. 8B, the subscriber routing table may have two routing options based on the day-of-week the call is placed to the subscriber's number; however, the subscriber routing table may have fewer or more than two routing options associated with each subscriber's telephone number. The routing table may be stored in the database of the SCP 26 and, in general, comprises a plurality of dialed numbers (i.e., the subscriber's telephone numbers) that are associated with one or more alternate telephone numbers serving as routing options. In the routing table of FIG. 8B, the first column contains the subscriber's telephone numbers. The second and third columns contain the subscriber defined alternate numbers to which a call to the subscriber's telephone number listed in the first column will be routed in accordance with the day-of-week that the call is placed. The day-of-week routing feature discussed below, may be combined with the time-of-day routing feature, such that calls are forwarded based on the day-of-week as well as the time-of-day.

Referring now to FIG. 8A, when the ISCP 10 receives a query message from the SSP at step 512 (from Point A in FIG. 4), the ISCP 10 retrieves the subscriber's routing service feature from the database of the SCP 26 at step 514. The ISCP 10 at step 516 determines the day-of-week and routes the incoming call to an alternate number in the routing table based on the day-of-week routing options defined by the subscriber. If, for example, the service logic of the subscriber's telephone numbers are arranged by group, then the dialed number may be used to locate the subscriber's group logic record at step 514. In such a case, the group record is accessed at the ISCP 10, so that the routing of the incoming call may be determined based on the group service logic and the routing table.

The subscriber may specify different numbers for particular days of the week. According to the example of FIG. 8A, if the ISCP 10 at step 516 determines the incoming call was placed between Monday and Friday, the ISCP 10 at step 518 directs the SSP 16 to route the call to an associated alternate number in column 2 of the routing table in FIG. 8B. If the ISCP 10 at step 504 determines the incoming call was placed on Saturday or Sunday, the ISCP 10 at step 520 directs the SSP to route the call to an associated alternate number in column 3 of the routing table in FIG. 8B. In this example, a call placed to NPA-NXX-XXX3 on Monday would be routed to NPA-NXX-XXX7, whereas a call placed to NPA-NXX-XXX1 on SATURDAY would be routed to NPA-NXX-XXX9.

Figure 9A:
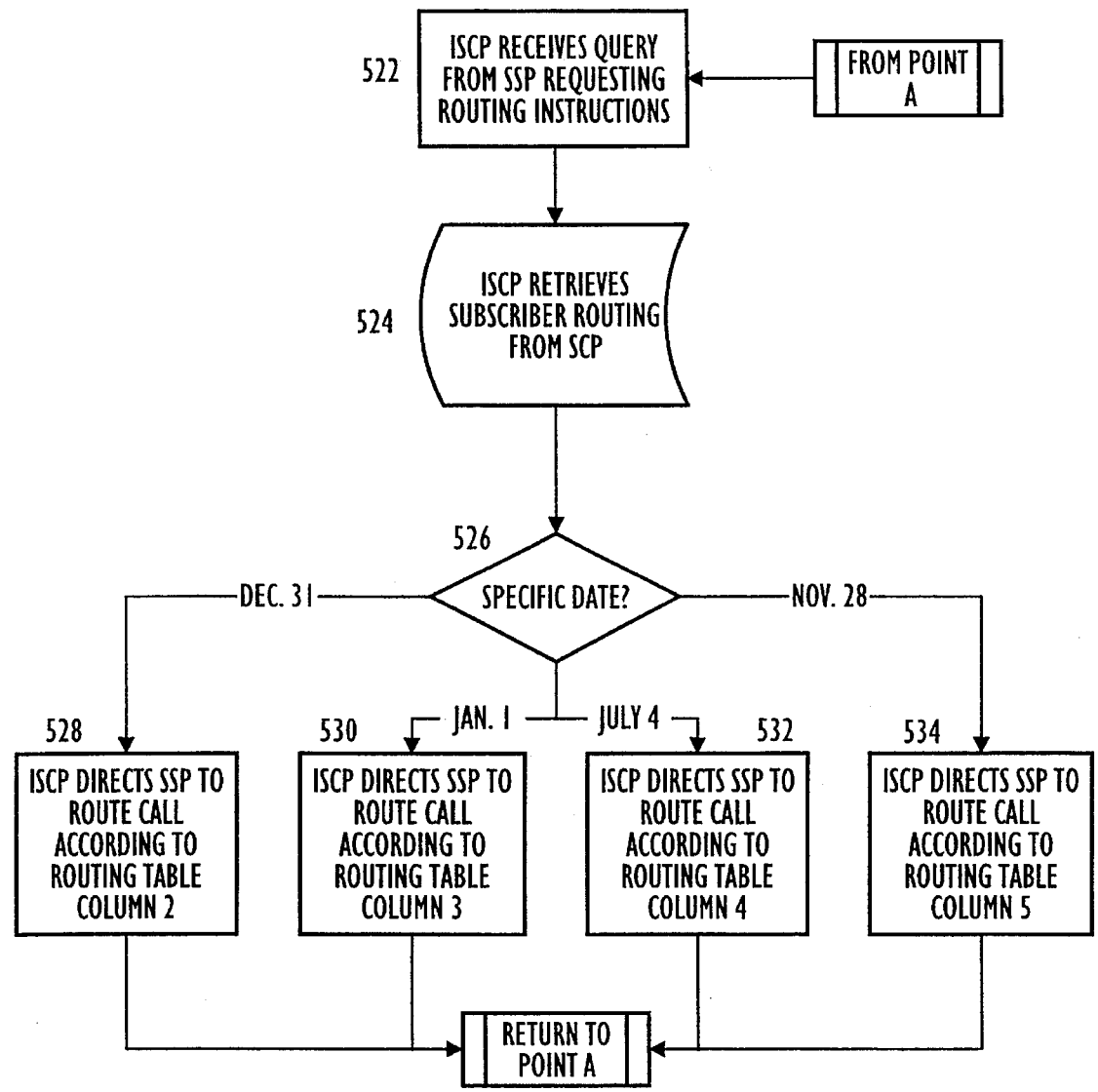
FIG. 9A is a flow chart illustrating the specific date routing service feature according to the present invention.

Referring now to FIGS. 9A and 9B, an embodiment of the specific date routing feature of the present invention will be discussed. As shown in FIG. 9B, the subscriber routing table may have four routing options based on the specific date the call is placed to the subscriber's number; however, the subscriber routing table may have fewer or more than four routing options associated with each subscriber's telephone number. The routing table may be stored in the database of the SCP 26 and, in general, comprises a plurality of dialed numbers (i.e., the subscriber's telephone numbers) that are associated with one or more alternate telephone numbers serving as routing options. In the routing table of FIG. 9B, the first column contains the subscriber's telephone numbers. The second, third, fourth and fifth columns contain the subscriber defined alternate numbers to which a call to the associated subscriber's telephone number listed in the first column will be routed in accordance with the specific date that the call is placed. The subscriber, for example, may define specific routing numbers for calls that are placed on holidays or other specific dates.

Referring now to FIG. 9A, when the ISCP 10 receives a query from the SSP at step 522 (from Point A in FIG. 4), the ISCP 10 retrieves the subscriber's routing service feature from the database of the SCP 26 at step 524. If, for example, the service logic of the subscriber's telephone numbers are arranged by group, then the dialed number may be used to locate the subscriber's group logic record at step 524. In such a case, the group record is accessed at the ISCP 10, so that the routing of the incoming call may be determined based on the group service logic and the routing table.

The ISCP 10 at step 526 determines the date and routes the incoming call to an alternate number in the routing table associated with the specific date. According to the example of FIG. 9A, if the ISCP 10 at step 526 determines that the incoming call was placed on December 31, the ISCP 10 at step 528 directs the SSP to route the call to an associated alternate number in column 2 of the routing table in FIG. 9B. If the ISCP 10 at step 526 determines the incoming call was placed on January 1, the ISCP 10 at step 530 directs the SSP to route the call to an associated alternate number in column 3 of the routing table in FIG. 9B. If the ISCP 10 at step 526 determines the incoming call was placed on July 4, the ISCP 10 at step 532 directs the SSP to route the call to an associated alternate number in column 4 of the routing table in FIG. 9B. If the ISCP 10 at step 526 determines the incoming call was placed on November 28, the ISCP 10 at step 534 directs the SSP to route the call to an associated alternate number in column 5 of the routing table in FIG. 9B. For example, if a call is placed to NPA-NXX-XXX3 on July 4, the call would be routed to NPA-NXX-XX11, whereas if a call is placed to NPA-NXX-XXX3 on November 28, then the call would be routed to NPA-NXX-XX15.

Figure 10A:
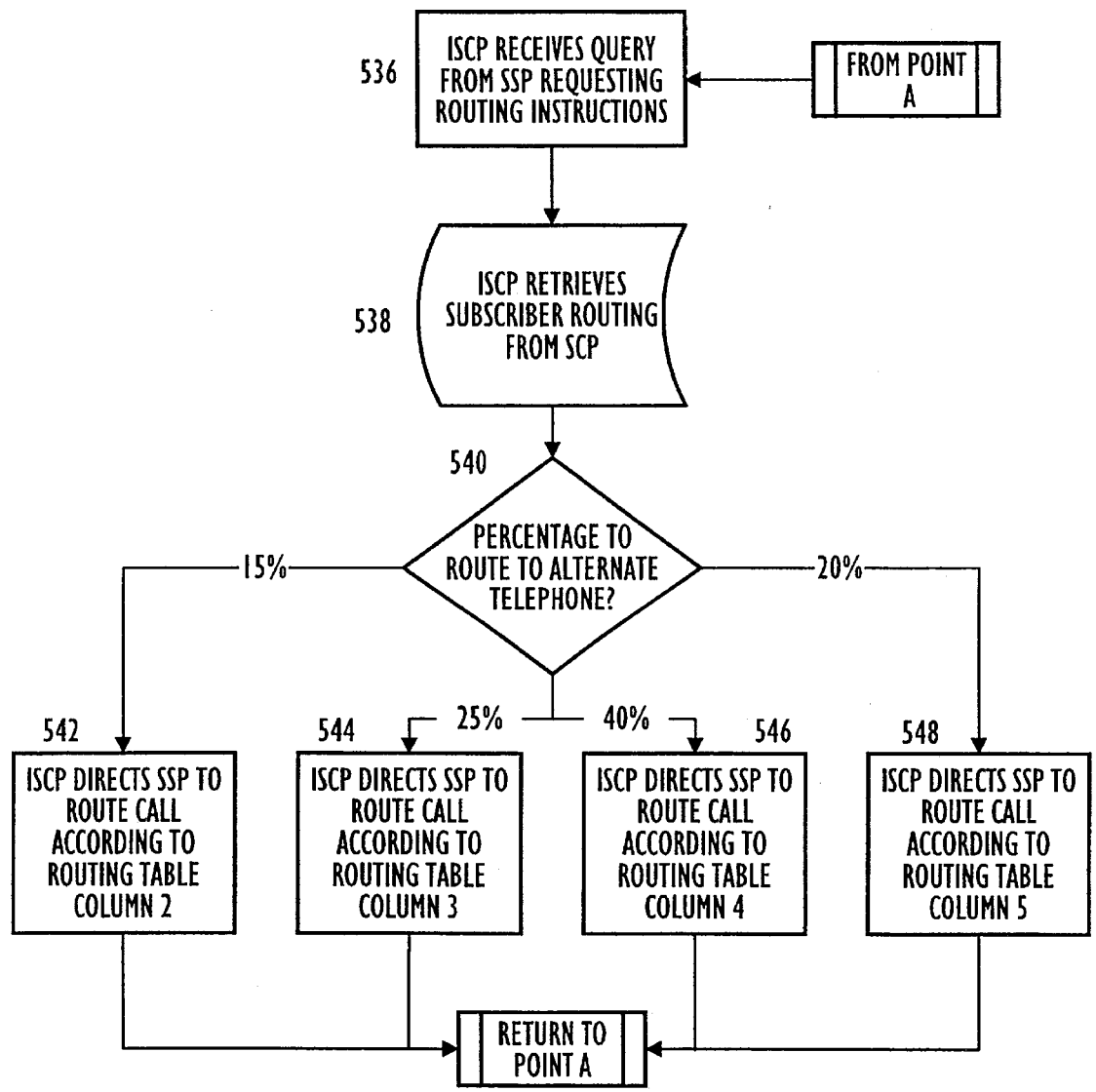
FIG. 10A is a flow chart illustrating the percentage allocation routing service feature according to the present invention.

Referring now to FIGS. 10A and 10B, an embodiment of the percentage allocation routing feature of the present invention will be discussed. As shown in FIG. 10B, the subscriber routing table may have four routing options based on a percentage of the total incoming calls placed to the subscriber's number. The subscriber routing table, however, may have fewer or more than four routing options based on a subscriber's needs. The routing table may be stored in the database of the SCP 26 and, in general, comprises a plurality of dialed numbers (i.e., the subscriber's telephone numbers) that are associated with one or more alternate telephone numbers serving as routing options. In the routing table of FIG. 10B, the first column contains the subscriber's telephone numbers. The second, third, fourth and fifth columns contain the subscriber defined alternate numbers to which a call to the associated subscriber's telephone number listed in the first column will be routed in accordance with percentage of calls received. In accordance with the present invention, the subscriber may allocate different or equal percentages of the incoming calls to each of the alternate routing numbers.

Referring now to FIG. 10A, when the ISCP 10 receives a query from the SSP at step 536 (from Point A in FIG. 4), the ISCP 10 retrieves the subscriber's routing service feature from the database of the SCP 26 at step 538. If the service logic of the subscriber's telephone numbers are arranged by group (e.g., Group 1 and Group 2), then the dialed number may be used to locate the subscriber's group logic record at step 538. In such a case, the group record is accessed at the ISCP 10, so that the routing of the incoming call may be determined based on the group service logic and the routing table.

The ISCP 10 at step 540 determines what percentage of the incoming calls have been routed to the alternate numbers and routes the incoming call to an alternate number accordingly. The percentages are defined by the subscriber. According to the example of FIG. 10A, the ISCP 10 at step 540 determines that 15% of the incoming calls are to be forwarded to the first alternate number, then at step 542 directs the SSP to route the call to an associated alternate number in column 2 of the routing table in FIG. 10B. The ISCP 10 at step 540 determines that 25% of the incoming calls are to be forwarded to the second alternate number, then at step 544 directs the SSP to route the call to an associated alternate number in column 3 of the routing table in FIG. 10B. The ISCP 10 at step 540 determines that 40% of the incoming calls are to be forwarded to the third alternate number, then at step 546 directs the SSP to route the call to an associated alternate number in column 4 of the routing table in FIG. 10B. The ISCP 10 at step 540 determines that 20% of the incoming calls are to be forwarded to the fourth alternate number, then at step 548 directs the SSP to route the call to an associated alternate number in column 5 of the routing table in FIG. 10B. In this example, 25% of the calls placed to NPA-NXX-XXX3 would be routed to NPA-NXX-XXX7 by the SSPs.

Figure 11A:
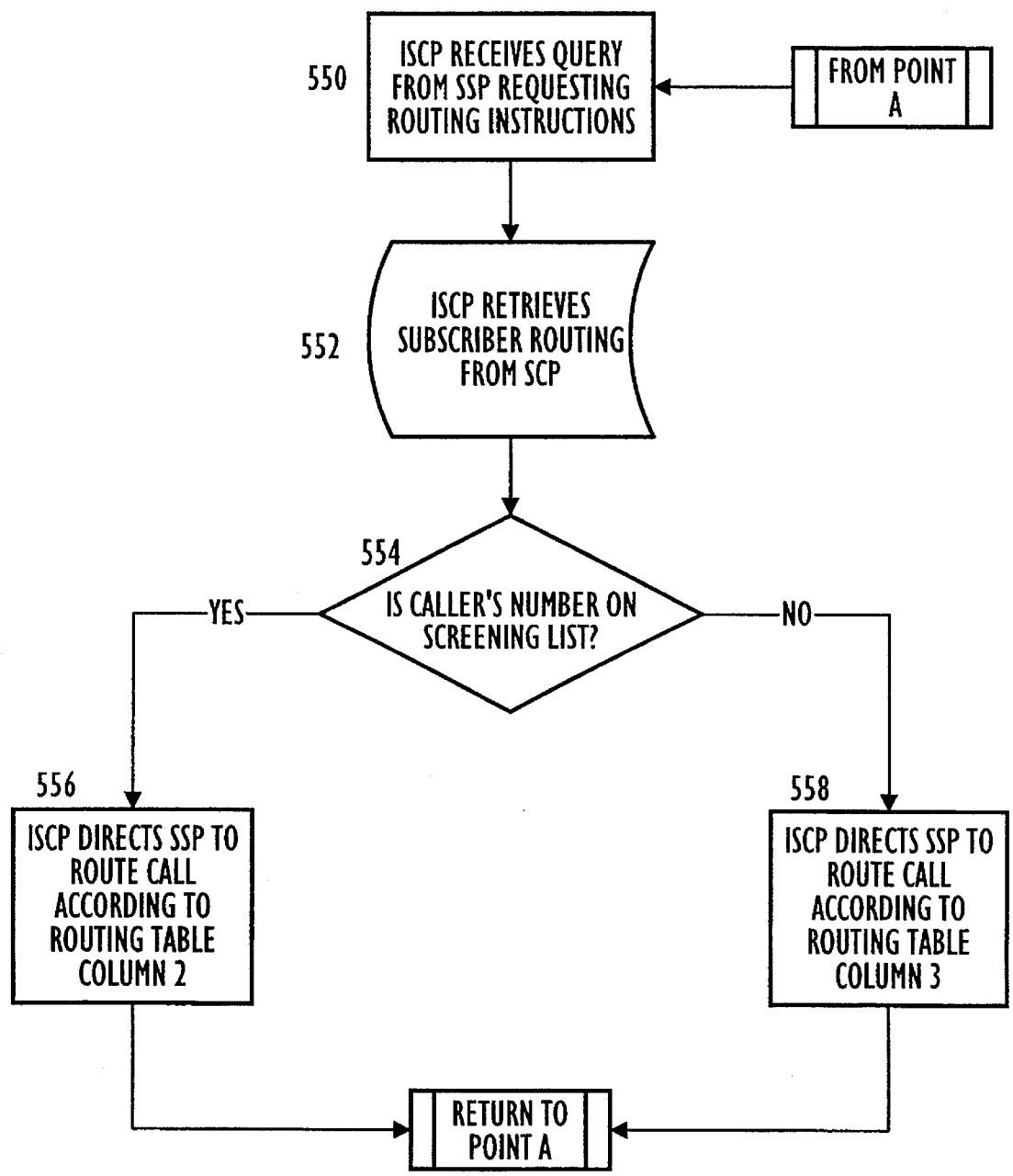
FIG. 11A is a flow chart illustrating the originating location routing service feature according to the present invention.

Referring now to FIGS. 11A and 11B, an embodiment of the originating number routing feature of the present invention will be discussed. As shown in FIG. 11B, the subscriber routing table may have two routing options (e.g., a first alternate number and a second alternate number) for each of the subscriber's telephone number. The routing options defined in the subscriber routing table may be executed based on a screening list defined by the subscriber. Such a screening list may be stored, along with the subscriber routing table in the database of the SCP 26 of the ISCP 10. As shown in FIG. 11C, the screening list may comprise a list of originating telephone numbers. If the calling party places a call to the subscriber from any one of the numbers defined in the screening list, the call may be routed to the first alternate number of the subscriber routing table. If, however, the call is not placed from any one of the numbers defined in the screening list, the call may then be routed to the second alternate number defined in the subscriber routing table.

In accordance with an aspect of the present invention, the first alternate number in the routing table may be the subscriber's telephone number, so that if the calling party's telephone number is on the screening list the call will be forwarded to the subscriber. For example, in the routing table of FIG. 11B, the first column contains the subscriber's telephone number, and the second column defines the first alternate number as being the subscriber's telephone number so that the call will be forwarded to the subscriber when there is a match on the screening list. The third column, on the other hand, defines the second alternate number where the call is to be routed when the calling party's number is not on the screening list.

Referring now to FIG. 11A, when the ISCP 10 receives a query from the SSP at step 550 (from Point A in FIG. 4), the ISCP 10 retrieves the subscriber's routing service feature from the database of the SCP 26 at step 552. If, for example, the service logic of the subscriber's telephone numbers are arranged by group, then the dialed number may be used to locate the subscriber's group logic record at step 552. In such a case, the group record is accessed at the ISCP 10, so that the routing of the incoming call may be determined based on the group service logic and the routing table.

The ISCP 10 at step 554 determines if the caller's number matches one of the numbers on the screening list and routes the incoming call to an alternate number accordingly. According to the example of FIG. 11A, if the ISCP 10 at step 554 determines the incoming caller's number is on the screening list, the ISCP 10 at step 556 directs the SSP to route the call to the first alternate number in column 2 of the routing table in FIG. 11B. If the ISCP 10 at step 554 determines the incoming caller's number is not on the screening list, the ISCP 10 at step 558 directs the SSP to route the call to the second alternate number in column 3 of the routing table. In this example, a call placed to NPA-NXX-XXX3 by a caller whose number is on the screening list (e.g., NPA-NXX-XX99) would be routed to NPA-NXX-XXX3, whereas a call placed to the same number by a caller not on the screening list would be routed to NPA-NXX-XXX7.

It is to be understood that the above described arrangement is merely illustrative of the application of the principles of the present invention and that numerous other arrangements may be devised by those skilled in the art without departing from the spirit and scope of the invention described herein. In the embodiment of FIGS. 5A–11A, for example, the call may be routed in accordance with different days of the week, times of the day, or specific dates than that illustrated and/or routed to a different routing number. Combinations of routing features are also possible, including forwarding incoming telephone calls to a group of subscriber telephone numbers according to the percent allocation routing feature and the time-of-day and/or day-of-week routing features. Alternatively, the incoming telephone calls to a subscriber number of a group (e.g., Group 1 or Group 2 in FIGS. 5B–11B) of subscriber telephone numbers could be forwarded according to the basic routing service feature in combination with other features, such as the time-of-day and/or day-of-week feature and the originating screening feature. Further, the call forwarding features of the present invention can be combined in a variety of ways to create many call forwarding possibilities as determined by the individual subscriber's needs.

In accordance with an aspect of the present invention, under normal conditions the terminating SSP will query the ISCP 10 to provide instructions, and ISCP 10 will respond with either a connection command which routes the call to a telephone number or a trunk number, or a command to play an announcement if caller interaction is necessary. Error messages (e.g., a bad data error message), however, may be exchanged between the terminating SSP and ISCP 10 via the CCS links 50 when an unexpected condition is detected. These messages are generally unidirectional, and can be sent from the SSP to the SCP 26, or from the SCP 26 to the SSP depending on where the error is detected. Error messages are either non-fatal or fatal. For instance, if a non-fatal error condition is detected at the SSP, a message is sent from the SSP to the SCP 26. When the SCP 26 receives the message, it takes appropriate action as determined by the service logic. A fatal error condition, however, generally results in the termination of the call.

According to another aspect of the present invention, subscribers may be provided with the ability to update and configure the service logic defining incoming call processing.

The subscriber update procedure according to the present invention will now be described with reference to FIGS. 12 through 17. In accordance with the invention, subscribers may make changes to their service logic by dialing a predetermined update telephone number established for the purpose of updating call forwarding features and options. After dialing the appropriate update telephone number, the subscriber may then enter a series of digits to initiate the update procedure. For example, subscribers may enter a group number representative of a group of subscriber telephone numbers and a group number personal identification number (PIN) to verify their identity. The subscriber would then respond to a series of interactive voice prompts to change the basic routing service feature option, e.g., from Option 1 to Option 2, or to change the group number PIN associated with each group of subscriber telephone numbers.

FIGS. 12 through 17 illustrate one example of an update procedure of the present invention, wherein a subscriber enters selections in response to announcements produced by the SSP 18. The numerical inputs described herein have been selected for the purpose of demonstrating the update procedure of the invention, and are in no way considered to be the sole implementation of the update procedure. Further, although FIGS. 12 through 17 illustrate an update procedure wherein the routing features of the subscriber's telephone numbers are collectively updated based on their relation to a defined group number, the routing features of each subscriber line may be updated individually by assigning only one subscriber line to a particular group number or by other suitable means.

Figure 12:
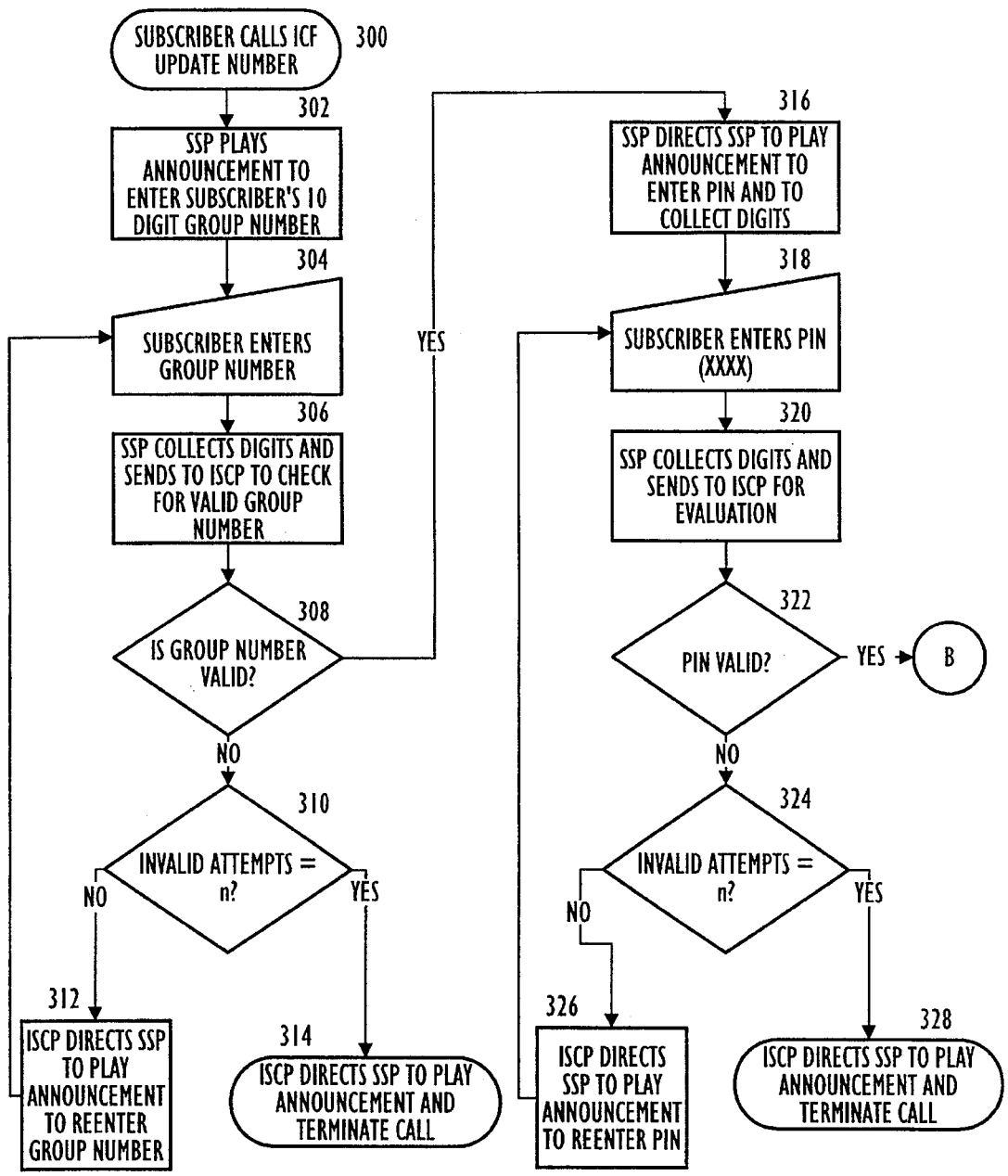
FIGS. 12 through 17 are flow charts illustrating the subscriber update procedure to selectively choose an option associated with the basic routing service feature of the present invention.

Referring now to FIG. 12, there is illustrated a flow chart of the initial portion of the subscriber update procedure for the basic routing service feature of the invention. At step 300, the subscriber dials the update telephone number for the purpose of creating a connection to the database of the SCP 26. For example, referring to FIG. 1, the update telephone number may designate SSP 18. After the appropriate update number has been entered, a CCS link between the SSP 18 and the ISCP 10 is created to transport data messages and update the database in accordance with the subscriber's inputs. All announcements to the subscriber may be made by the SSP 18. During the update procedure, the ISCP 10 determines how to update the subscriber's service logic based on subscriber responses to voice prompts. The SSP 18 may be directed by the ISCP 10 at various points to play announcements, collect the subscriber's inputs and return the inputs to the ISCP 10 for evaluation. This procedure may continue until the subscriber hangs up, the ISCP 10 determines that the subscriber has selected to terminate the call, or the ISCP 10 determines the subscriber is in a loop and directs the SSP 18 to play a terminating message.

At step 302 in FIG. 12, the SSP plays an announcement prompting the subscriber to enter a 10-digit group number associated with the subscriber's telephone numbers and the service logic feature. At step 304, the subscriber enters the group number and the SSP collects the digits and sends them to the ISCP 10 for evaluation at step 306. At step 308, the ISCP 10 determines if the group number is valid. If the group number is invalid, the ISCP 10 at step 310 determines the number of invalid attempts the subscriber has made to enter the group number. If the number of attempts is, for example, less than "n" equal to three, the ISCP 10 at step 312 instructs the SSP to play an announcement that the group number entered is invalid and that the subscriber should reenter the group number. The number of attempts by the subscriber allowed by the ISCP 10 can be value other that three. The procedure then flows back to step 304. If, however, the ISCP 10 determines that the number of attempts is equal to three at step 310, the ISCP 10 directs the SSP at step 314 to play an announcement that entry is invalid and to terminate the call.

If the group number entered by the subscriber is valid, processing continues at step 316 where the ISCP 10 instructs the SSP to play an announcement to the subscriber to enter the group PIN associated with the group number. At step 318, the subscriber enters the PIN which is collected by the designated SSP and sent to the ISCP 10 for evaluation at step 320. A valid PIN number, for example, may be a four-digit number. If the ISCP 10 determines at step 322 that the PIN is invalid, the ISCP 10 determines at step 324 whether the number of invalid attempts by the subscriber is equal to a predetermined number (e.g., three). If the number of invalid attempts is less than three, for example, the ISCP 10 directs the SSP at step 326 to play an announcement that the PIN is invalid and to reenter the PIN. Processing then returns to step 318 where the subscriber enters the PIN again. If, however, at step 324 the ISCP 10 determines that the number of invalid attempts is equal to three, the ISCP 10 instructs the SSP at step 328 to play an announcement that the PIN is invalid and to terminate the call.

Figure 13:
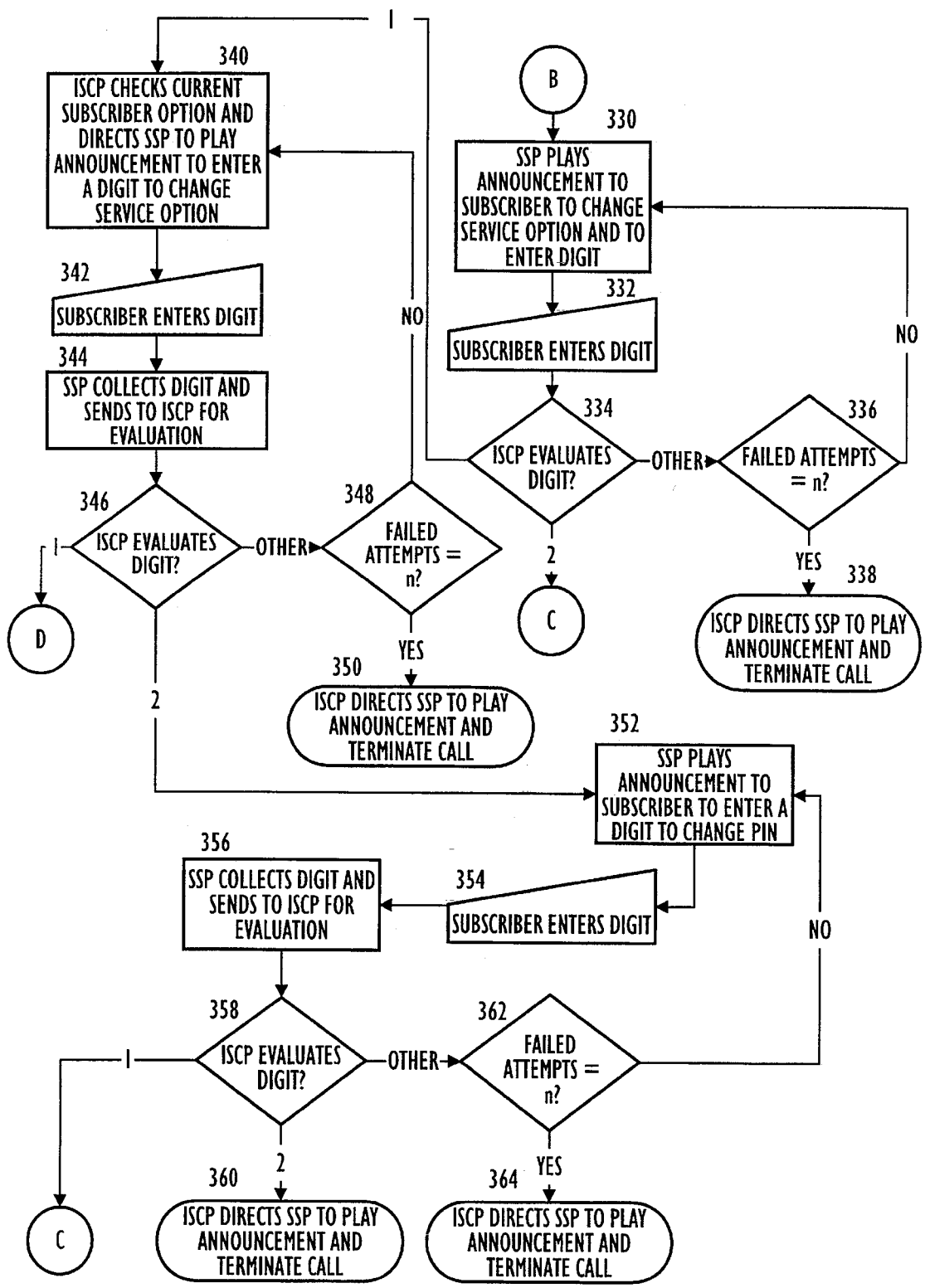

If at step 322 the ISCP has determined the subscriber has entered a valid PIN, processing continues at step 330 in FIG. 13. As shown in FIG. 13, the SSP at step 330 plays an announcement to prompt the subscriber for a response digit to select either to change the service option associated with the basic routing feature or to change the group number PIN. At step 332 the subscriber enters the digit. In this example, the subscriber enters a "1" to change the service option, or a "2" to change the group number PIN. Other entered digits may be evaluated by the ISCP 10 at step 334 to be invalid entries. If the ISCP 10 determines at step 334 that the subscriber entered an invalid digit, the subscriber is replayed the options at step 330 by the SSP and enters a response at step 332. The subscriber may be allowed three attempts to enter a valid digit at step 332, after which the ISCP 10 directs the SSP at step 338 to play an announcement that the digit is not valid and the call is terminated.

If the ISCP 10 determines at step 334 that the subscriber entered a "1" and chose to change the service option associated with the basic routing service feature, then processing continues at step 340. The ISCP 10 at step 340 determines the current service option and directs the SSP to play an announcement informing the subscriber of the current service option and to enter a digit to either change the service option or to leave the service option as it is. The subscriber enters the digit at step 342. The SSP collects the digit at step 344 and sends it to the ISCP 10 for evaluation. The ISCP 10 evaluates the digit at step 346 to determine what digit was entered, and if it is a valid input. The subscriber may be allowed three opportunities to enter a valid digit. At step 348, if the ISCP determines that the input is invalid and that the number of invalid attempts is less than three, then processing returns to step 340. After the third invalid attempt, the ISCP 10 at step 350 will direct the SSP to play an announcement that the entry is not valid and to terminate the call.

If the ISCP 10 determines at step 346 that the digit entered was a "2" at step 342, the subscriber has chosen to leave the service option as it is. The SSP is then instructed by the ISCP to play an announcement at step 352 prompting the subscriber either to change the group PIN, or to exit the update procedure. The subscriber responds by entering a digit at step 354. The SSP collects the digit at step 356 and sends it to the ISCP 10 for evaluation. At step 358 the ISCP 10 determines what digit the subscriber has entered at step 354. In this example, a "1" indicates that the subscriber wants to change the group PIN, and a "2" indicates that the subscriber wishes to exit the update procedure. Other entered digits are treated by the ISCP as invalid and processing returns to step 352 to prompt the subscriber to enter a valid digit. The subscriber may be allowed three opportunities to enter a valid digit at step 362, after which the ISCP 10 directs the SSP at step 364 to play an announcement that the entry is not valid and to terminate the call.

If the ISCP 10 determines at step 358 that the subscriber chose to exit the update procedure at this point by entering a "2" at step 354, the ISCP 10 directs the SSP at step 360 to play an announcement thanking the subscriber for calling and to terminate the call.

If, however, the ISCP 10 determines at step 358 that the subscriber wants to change the group number PIN by entering a "1" at step 354, processing continues at step 420 in FIG. 17 (described below).

Figure 14:
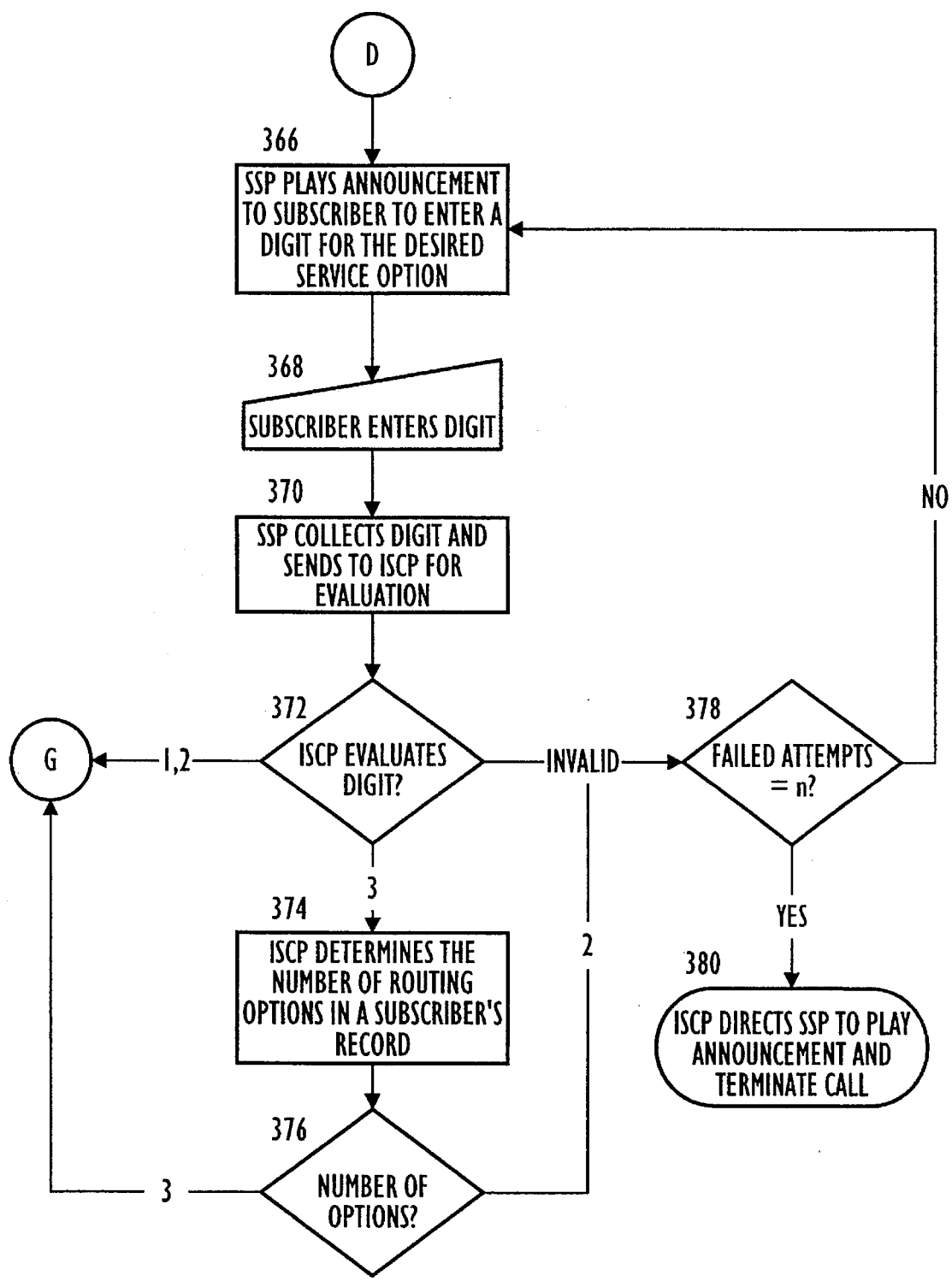

Referring again to FIG. 13, if at step 346 the ISCP 10 determines that the subscriber has chosen to update the service option by entering a "1", update processing continues at step 366 in FIG. 14. As shown in FIG. 14, the SSP plays at step 366 an announcement to the subscriber to enter a digit for the service option that the subscriber wants to activate. The subscriber was informed at step 330, in FIG. 13, the he or she could change the present active option and, therefor, is prompted to choose a different option at step 366. The subscriber enters a digit at step 368 to change the service option. At step 370 the SSP collects the digit and sends it to the ISCP 10 for evaluation.

The ISCP 10 at step 372 evaluates the subscriber input and determines the number of routing options in the subscriber's routing table. This step is completed so that the subscriber does not select an invalid routing option. For example, if the subscriber enters a "3" at step 368 to select Option 3, the ISCP 10 at step 374 determines the number of routing options available. If the ISCP 10 determines at step 374 that the subscriber has only two routing options available, a "3" entered in response to the prompt at step 366 would be an invalid input because there is no third routing option available. If the subscriber has at least three routing options defined, a "3" would be a valid entry at step 368, as well as a "1" or a "2". As shown in FIG. 14, the subscriber may be given three opportunities to enter a valid digit at steps 372 and 376. If the number of invalid attempts is determined by the ISCP 10 to be less than three at step 378, call processing returns to step 366 where the SSP is instructed to play an announcement to the subscriber prompting for a valid input. After the third invalid input is determined at step 378, the ISCP 10 at step 380 directs the SSP to play an announcement and to terminate the call.

Figure 15:
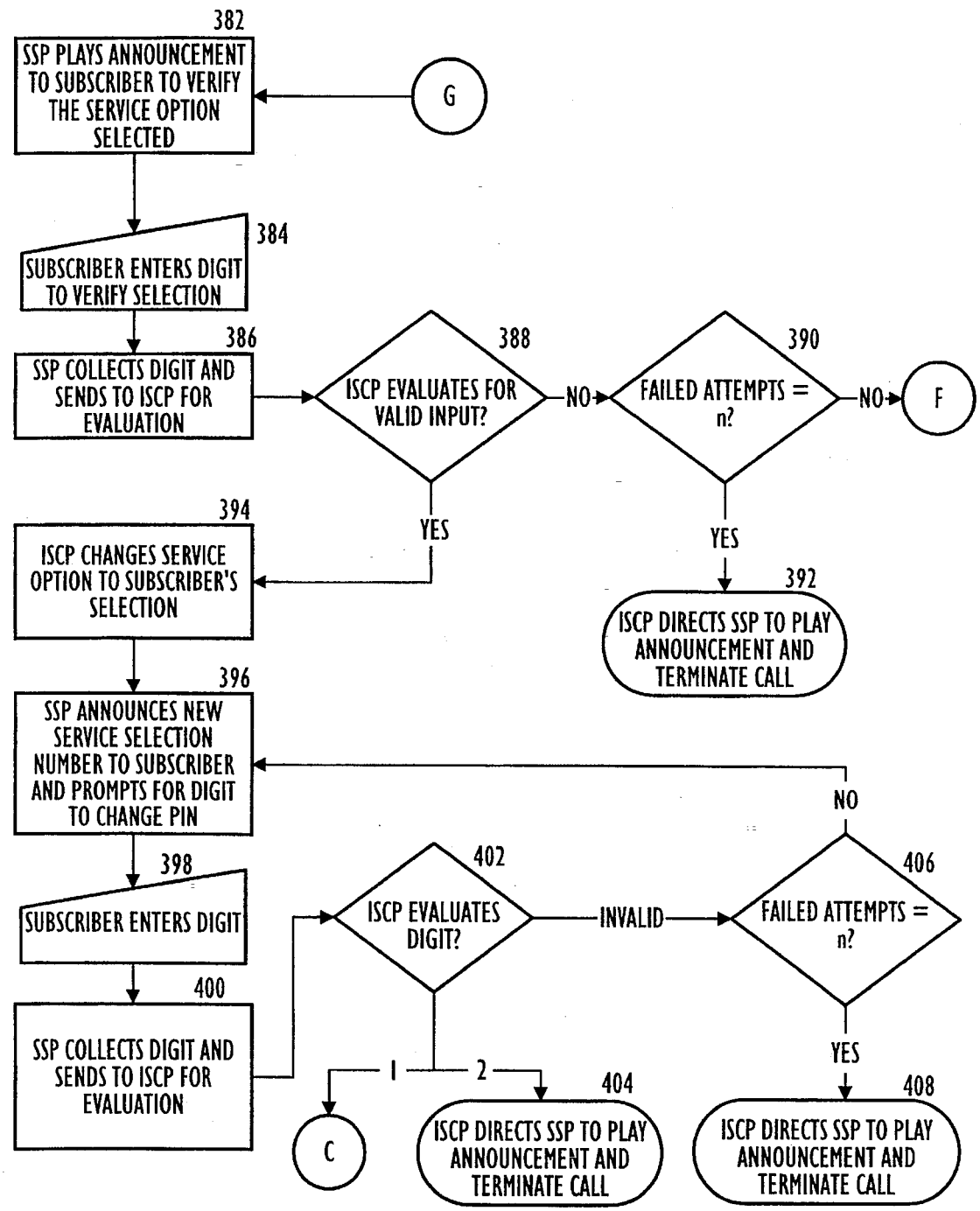

If the ISCP 10 determines at step 372 or step 376 that the subscriber has entered a valid input at step 368, then update processing continues at step 382 in FIG. 15. As shown in FIG. 15, the SSP at step 382 plays an announcement to enter a digit to verify the service option selected at step 368. The subscriber enters a digit at step 384 verifying the option selection and the SSP collects the digit at step 386 and sends it to the ISCP 10 for evaluation.

Figure 16:
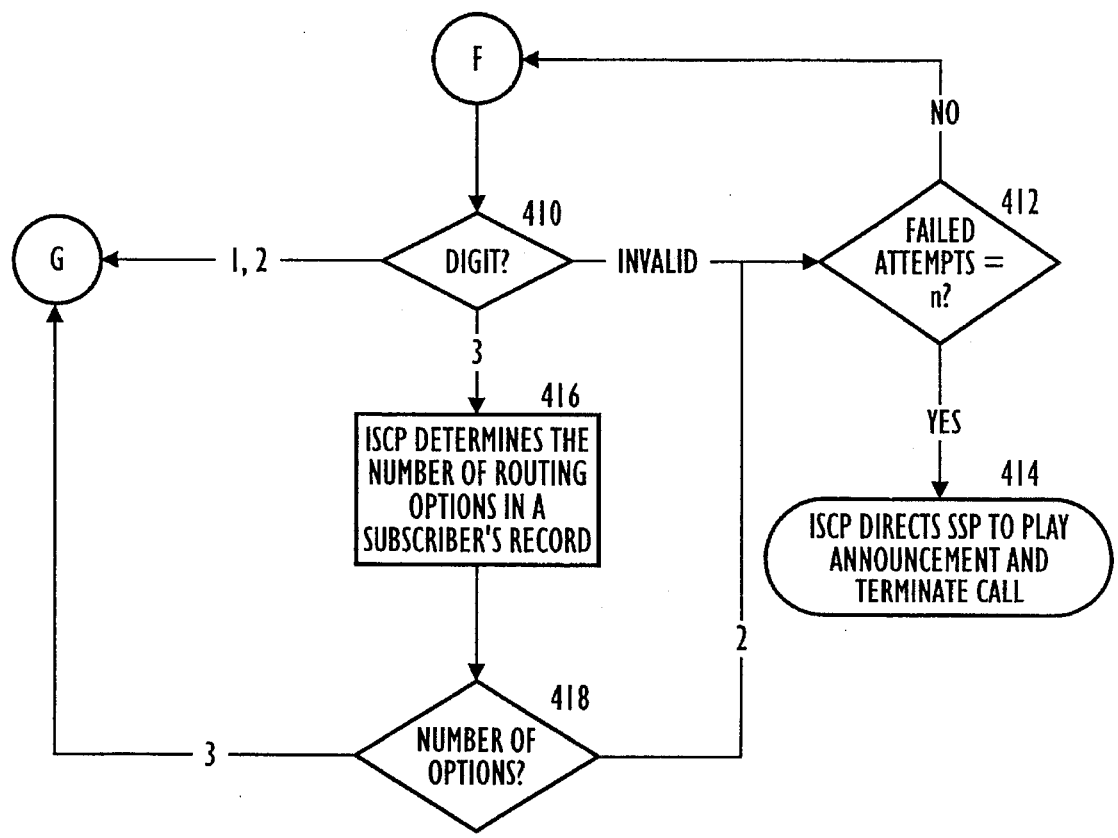

If the ISCP 10 determines at step 388 that the subscriber has entered an invalid digit at step 384, the ISCP 10 determines at step 390 whether it is the third invalid input. The subscriber may be limited to three invalid inputs. If it is not the third invalid input, update processing continues at step 410 in FIG. 16. As shown in FIG. 16, the ISCP 10 at steps 410–418 determines the number of routing options in the subscriber's database record in a manner similar to that disclosed hereinbefore with reference to steps 372–380 in FIG. 14, and processing returns to step 382 in FIG. 15 for further subscriber input or the call is terminated at step 414.

If the ISCP 10 determines at step 388 that the subscriber has entered a valid input digit and verified his or her selection at step 384, the ISCP 10 at step 394 changes the service option stored in the database of the SCP 26 associated with the subscriber's basic routing service features. The ISCP 10 at step 396 then directs the SSP to play an announcement informing the subscriber that the service option has been changed and prompts the subscriber with further options either to enter a "1" to change the group number PIN, or to enter a "2" to exit the update routine. The subscriber enters a digit at step 398 and the SSP collects the digit and sends it to the ISCP 10 for evaluation at step 400. At step 402, the ISCP evaluates the digits.

Figure 17:
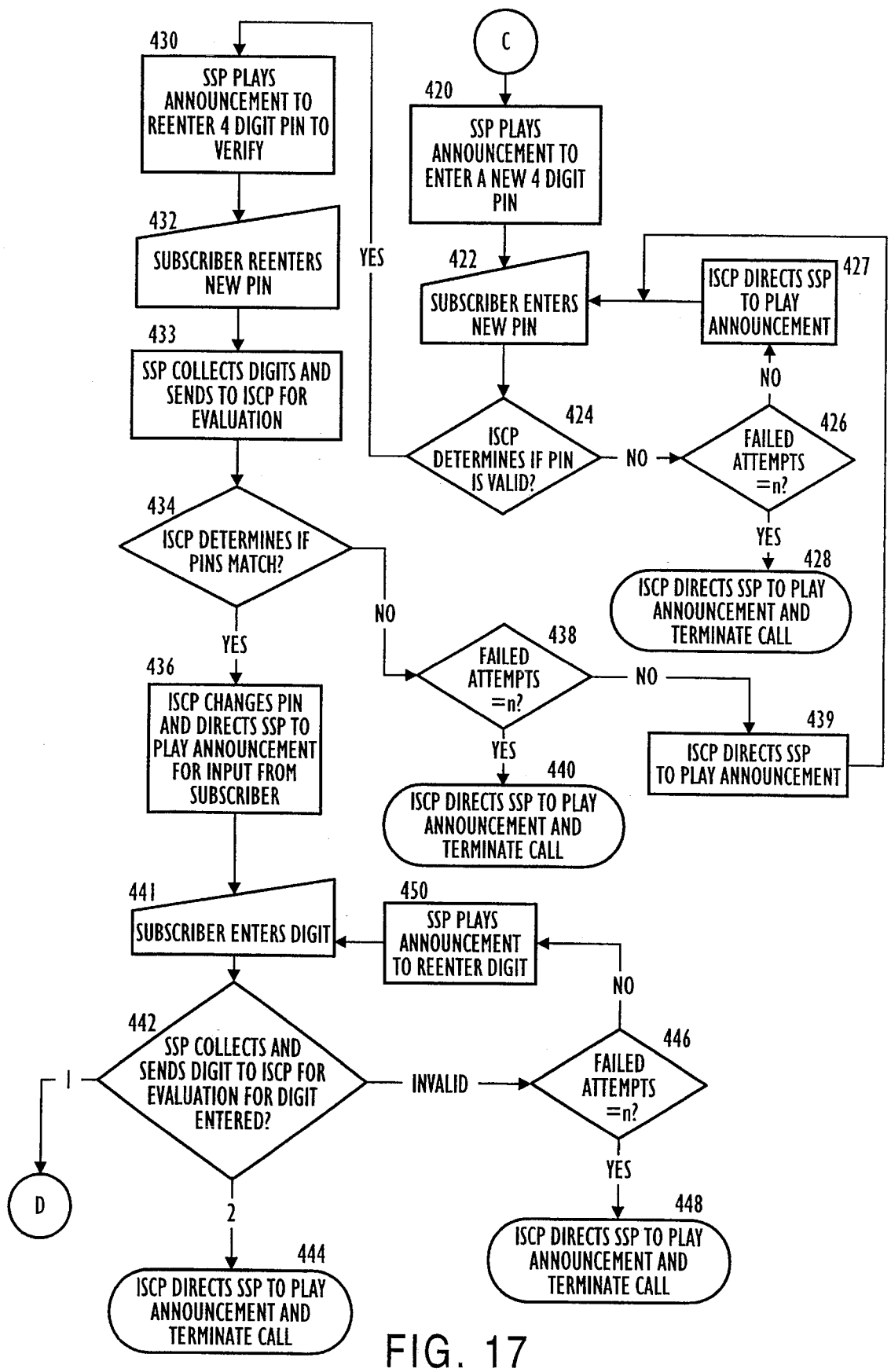
Figure 18:
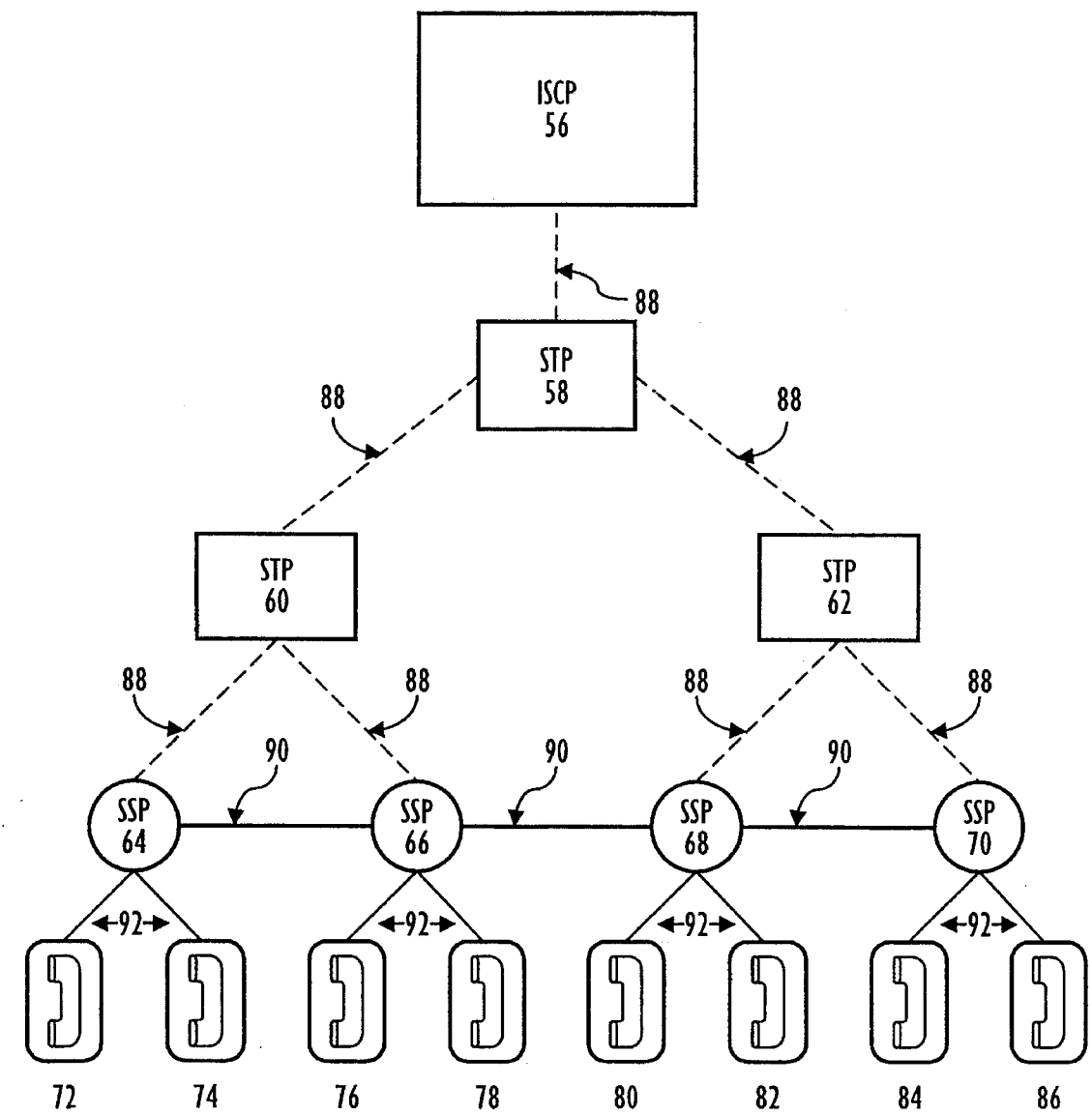
FIG. 18 is a block diagram of the basic components of an AIN system.

If the ISCP 10 determines at step 402 that the subscriber has entered a "1" processing continues at step 420 in FIG. 17 If the subscriber chooses to exit by entering a "2" at step 398, the ISCP 10 at step 404 directs the SSP to play an announcement thanking the subscriber for calling and to disconnect the call. If the digit was invalid, the subscriber may be allowed three opportunities at step 406 to enter a valid digit at step 398, after which the ISCP 10 at step 408 directs the SSP to play an announcement that the entry is not valid and to terminate the call. If less than three invalid data inputs have entered, then the call processing returns to step 396, as shown in FIG. 15.

If the subscriber chooses to change the group number PIN, by entering a "1" at step 398, update processing continues at step 420 in FIG. 17 which illustrates the update processing to change the group number PIN. At step 420, the SSP plays an announcement to the subscriber to enter a new PIN. At step 422, the subscriber enters the new PIN. At step 422 the SSP collects the digits and sends them to the ISCP 10 for evaluation. At step 424, the ISCP 10 determines if the PIN is valid. A valid PIN may contain, for example, four digits. If the ISCP 10 at step 424 determines that the PIN is not valid, the ISCP 10 at step 426 determines the number of invalid attempts. The subscriber may be allowed three attempts to enter a valid PIN, after which the ISCP 10 at step 428 directs the SSP to play an announcement that the PIN entered is invalid and to terminate the call. Otherwise, if the ISCP 10 determines the PIN entered at step 422 is invalid, but not the third invalid attempt, the ISCP 10 at step 427 directs the SSP to play an announcement that the PIN is invalid and to enter a new group number PIN. Processing then returns to step 422, as shown in FIG. 17.

If the ISCP 10 determines at step 424 that a valid PIN was entered, the ISCP 10 directs the SSP to play an announcement to verify the new PIN at step 430. The subscriber reenters the new PIN at step 432 to verify the previously entered PIN. At step 433, the SSP collects the digits and sends them to the ISCP 10 to determine, at step 434, if the reentered PIN matches the previously entered PIN. If the ISCP 10 determines at step 434 that the previously entered PIN at step 422 does not match that reentered PIN at step 432, the ISCP 10 at step 438 determines the number of allowable attempts to enter a matching PIN. Once again, the subscriber may be allowed three opportunities to reenter a matching PIN at step 432, after which the ISCP 10 at step 440 directs the SSP to play an announcement that the PINs do not match and to terminate the call. If the ISCP 10 determines at step 438 that it is not the third invalid attempt to reenter a matching PIN, the ISCP 10 at step 439 directs the SSP to play an announcement to enter a new group PIN and processing returns to step 422.

If the ISCP 10 determines at step 434 that the previously entered PIN and the reentered PIN match, the ISCP 10 at step 436 changes the group number PIN stored in the database of the SCP 26, and directs the SSP to play an announcement confirming that the PIN has been changed in the database of the SCP 26. At step 436, the SSP prompts the subscriber for a digit to either change the service option by entering a "1", or to exit the update routine by entering a "2". In response to the announcement, the subscriber enters the digit at step 441.

As shown in FIG. 17, the SSP collects the digit and sends it for evaluation by the ISCP 10 at step 442. If the ISCP 10 at step 442 determines that the subscriber entered a "1" processing continues at step 366 in FIG. 14 where the subscriber updates the service option. If at step 442 the ISCP 10 determines that a "2" was entered and the subscriber chooses to exit, the ISCP 10 directs the SSP at step 444 to play an announcement thanking the subscriber for calling and to terminate the call. If, however, the ISCP 10 determines at step 442 that the subscriber has entered an invalid digit, at step 446 the subscriber may be given three opportunities to enter a valid digit, after which the ISCP 10 directs the SSP at step 448 to play an announcement that the entry is not valid and to terminate the call. If the ISCP 10 determines at step 446 that it is not the third invalid attempt to enter a digit at step 441, the ISCP 10 at step 450 instructs the SSP to play an announcement to reenter the appropriate digit. Processing then returns to step 441, as illustrated in FIG. 17.

It is to be understood that the above described arrangement is merely illustrative of the application of the principles of the present invention and numerous other arrangements may be devised by those skilled in the art without departing from the spirit and scope of the invention described herein.

For example, in accordance with the present invention, the subscriber's service logic may also be updated and changed using the SCE 32. The SCE 32 is a terminal device located at the ISCP 10 and has access to program the database in the SCP 26. Using the SCE 32 all of the call forwarding features according to the present invention can be modified. Changes through the SCE 32 may be achieved by a subscriber contacting a service representative (e.g., by telephone, fax or mail) and indicating the changes to be manually entered at the SCE 32. This method of update and configuration would be useful if the subscriber does not have access to a Dual Tone Multiple Frequency (DTMF) telephone.

In the alternative, a voice-recognition system for updating and configuring the intelligent call forwarding features and options may be provided. The subscriber may call an update telephone number and respond to prompts by speaking into the telephone. The subscriber's voice commands would then be converted into commands which would instruct the ISCP 10 to modify the call forwarding features.

While the invention has been described with references to several exemplary embodiments, it is understood that the words which have been used herein are words of description and illustration, rather than words of limitations. Changes may be made, within the purview of the appended claims, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. An intelligent call forwarding system for use in a communications network, said network comprising a plurality of communication lines extending between dispersed network locations, each of said locations being identified by a communication line number, and a plurality of service switching points for selectively interconnecting said communication lines in order to establish a communication connection between at least two of said locations, said communication connection being established in response to a service request by a caller located at one of said locations, said intelligent call forwarding system comprising:

a service control point comprising a routing list for storing a plurality of subscriber communication line numbers and at least one alternate routing option associated with each of said subscriber communication line numbers, and a group record for storing group numbers, each of said group numbers identifying predetermined groups of one or more subscriber communication line numbers and service logic associated with each of said group numbers, said service logic identifying said at least one alternate routing option for each of said groups; and a signaling communications system for establishing two-way communication of data messages between said plurality of service switching points and said service control point, said signaling communications system comprising means for transmitting a query message from one of said plurality of service switching points to said service control point in response to said service request from said caller to establish communication with a subscriber, said query message including a communication line number of said caller and a dialed subscriber communication line number; and said service control point further comprising means for accessing one of said group numbers and said associated service logic from said group record based on said dialed subscriber communication line number, means for retrieving said at least one alternate routing option from said routing list based on said one group number associated with said dialed subscriber communication line number and said service logic accessed by said accessing means, and means for instructing one of said service switching points, through said signaling communications system, to route the service request in accordance with said at least one alternate routing option retrieved by said retrieving means.

2. An intelligent call forwarding system according to claim 1, further comprising means for selectively updating said group record, said updating means including means for modifying said service logic associated with each of said groups of subscriber communication line numbers.

3. An intelligent call forwarding system according to claim 2, wherein said updating means comprises means for prompting said subscriber for an associated group number and an update option request to be performed by said modifying means.

4. An intelligent call forwarding system according to claim 3, wherein said prompting means further prompts said subscriber for a group personal identification number (PIN) associated with said one group number for authorizing said updating means to modify said group record.

5. An intelligent call forwarding system according to claim 4, wherein said update option request comprises one of a request to change said service logic and a request to change said group personal identification number (PIN).

6. An intelligent call forwarding system according to claim 5, wherein said modifying means modifies said service logic in accordance with a service change request inputted by said subscriber in response to said update option request.

7. An intelligent call forwarding system according to claim 5, wherein said modifying means modifies said group personal identification number (PIN) in accordance with a new personal identification number (PIN) inputted by said subscriber.

8. An intelligent call forwarding system according to claim 1, wherein said at least one alternate routing option comprises routing to alternate communication line numbers.

9. An intelligent call forwarding system according to claim 8, wherein said alternate communication line numbers comprise said dialed subscriber communication line number.

10. An intelligent call forwarding system according to claim 8, wherein said alternate communication line numbers comprise alternate subscriber communication line numbers, said alternate subscriber communication line numbers stored in said routing list.

11. An intelligent call forwarding system according to claim 1, said at least one alternate routing option comprising at least one of a routing based on a predetermined time-of-day, a routing based on a predetermined day-of-week, a routing based on a predetermined percentage allocation, a routing based on a predetermined date, and a routing based on an originating location of said caller.

12. An intelligent call forwarding system according to claim 11, said service control point further comprising a screening list storing a plurality of communication line numbers, and means for determining if said caller communication line number corresponds to one of said communication line numbers of said screening list, said instructing means instructing one of said service switching points, when said originating location routing option is active, to establish said communication connection between said caller and said dialed subscriber communication line number when said determining means determines that there is a correspondence between said caller communication line number and at least one of said communication line numbers of said screening list.

13. An intelligent call forwarding system according to claim 12, wherein said instructing means instructs one of said service switching points, when said originating location routing option is active, to route said service request to one of said alternate communication line numbers when said determining means determines that there is not a correspondence between said caller communication line number and any of said communication line numbers of said screening list.

14. An intelligent call forwarding system according to claim 1, wherein said at least one alternate routing option comprises a basic routing service feature, said basic routing feature comprising a plurality of routing features, each of said routing features having an alternate routing communication line number and being selectively activated by said subscriber.

15. An intelligent call forwarding system according to claim 1, said service control point comprising an integrated service control point, said integrated service control point comprising a service management system, a data reporting system, and a service creation environment.

16. In a communications network comprising communication lines extending between dispersed network locations, each of said locations being identified by a communication line number, a plurality of service switching points for selectively interconnecting said communication lines in order establish a communication connection between at least two of said locations, said communication connection being established in response to a service request by a caller located at one of said locations, a service control point comprising a routing list for storing a plurality of subscriber communication line numbers and at least one alternate routing option associated with each of said subscriber communication line numbers, and a group record for storing group numbers, each of said group numbers identifying predetermined groups of one or more subscriber communication line numbers and service logic associated with each of said group numbers, said service logic identifying said at least one alternate routing option for each of said groups, and a signaling communications system for establishing two-way communication of data messages between said plurality of service switching points and said service control point, a method for selectively forwarding incoming calls to said subscriber comprising the steps of:

receiving, at one of said plurality of service switching points, a service request from said caller to establish a communications connection with said subscriber;

suspending said service request at said least one of said plurality of service switching points and forwarding a query message from one of said service switching points to said service control point, said query message including a communication line number of said caller and a dialed communication line number of said subscriber;

accessing an associated group number and said associated service logic from group record based on said dialed subscriber communication line number;

retrieving said at least one alternate routing option from said routing list based on said dialed subscriber communication line number, said accessed associated group number and said accessed service logic; and instructing one of said service switching points, through said signaling communications system, to route the service request in accordance with said retrieved at least one alternate routing option.

17. A call forwarding method according to claim 16, further comprising selectively updating said group record, said updating including modifying said service logic associated with each of said groups of subscriber communication line numbers.

18. A call forwarding method according to claim 17, wherein said updating comprises prompting said subscriber for an associated group number and an update option request to be performed by said modifying.

19. A call forwarding method according to claim 18, wherein said prompting further prompts said subscriber for a group personal identification number (PIN) associated with said group for authorizing said updating to modify said group record.

20. A call forwarding method according to claim 19, wherein said update option request comprises one of a request to change said service logic and a request to change said group personal identification number (PIN).

21. A call forwarding method according to claim 20, wherein said modifying modifies said service logic in accordance with a service change request inputted by said subscriber in response to said update option request.

22. A call forwarding method according to claim 20, wherein said modifying modifies said group personal identification number (PIN) in accordance with a new personal identification number (PIN) inputted by said subscriber.

23. A call forwarding method according to claim 16, wherein said at least one alternate routing option comprises routing to alternate communication line numbers.

24. A call forwarding method according to claim 23, wherein said alternate communication line numbers comprise said dialed subscriber communication line number.

25. A call forwarding method according to claim 23, wherein said alternate communication line numbers comprise alternate subscriber communication line numbers, said alternate subscriber communication line numbers stored in said routing list.

26. A call forwarding method according to claim 16, said at least one alternate routing option comprising at least one of a routing based on a predetermined time-of-day, routing based on a predetermined day-of-week, a routing based on a predetermined percentage allocation, a routing based on a predetermined date, a routing based on an originating location of said caller, and a routing based on inputs by said caller in response to prompts.

27. A call forwarding method according to claim 26, said service control point further comprising a screening list storing a plurality of communication line numbers, said method further comprising determining if said caller communication line number corresponds to one of said communication line numbers of said screening list, said instructing comprising instructing one of said service switching points, when said originating location routing option is active, to establish said communication connection between said caller and said dialed subscriber communication line number when it is determined that there is a correspondence between said caller communication line number and at least one of said communication line numbers of said screening list.

28. An intelligent call forwarding system according to claim 27, wherein said instructing comprises instructing one of said service switching points, when said originating location routing option is active, to route said service request to one of said alternate communication line numbers when it is determined that there is not a correspondence between said caller communication line number and any of said communication line numbers of said screening list.

29. A call forwarding method according to claim 16, wherein said at least one alternate routing option comprises a basic routing service feature, said basic routing feature comprising a plurality of routing features, each of said routing features having an alternate routing communication line number and being selectively activated by said subscriber.

30. In a communications network comprising communication lines extending between dispersed network locations, each of said locations being identified by a communication line number, a plurality of service switching points for selectively interconnecting said communication lines in order to establish a communication connection between at least two of said locations, a service control point comprising a routing list for storing a plurality of subscriber communication line numbers and at least one alternate routing option associated with each of said subscriber communication line numbers, and a group record for storing group numbers, each of said group numbers identifying predetermined groups of one or more subscriber communication line numbers and service logic associated with each of said group numbers, said service logic identifying said at least one alternate routing option for each of said groups, and a signaling communications system for establishing two-way communication of data messages between said plurality of service switching points and said service control point, a method for updating said group record comprising the steps of:

prompting, from one of said service switching points, said subscriber for one of said group numbers;

collecting said one of said group numbers at said one of said service switching points;

forwarding, through said signaling communications system, said one of said group numbers from said one of said service switching points to said service control point;

verifying, at said service control point, said one of said group numbers;

prompting, from one of said service switching points, said subscriber for an access identification number;

collecting said access identification number at said one of said service switching points:

forwarding, through said signaling communications system, said access identification number from said one of said service switching points to said service control point;

verifying, at said service control point, said access identification number;

thereafter, prompting said subscriber from one of said service switching points to select one of a plurality of update option requests, said update option requests comprising options to modify said group record;

collecting a response entered by said subscriber at said one of said service switching points and forwarding, through said signaling communications system, said response from said one of said service switching points to said service control point; and updating, at said service control point, said group record in accordance with said response.

31. A method for updating said subscriber database according claim 30, wherein said options to modify said group record includes an option to modify said service logic associated with said group number entered by said subscriber.

32. A method for updating said subscriber database according to claim 31, wherein said option to modify said service logic includes a request to selectively activate one of said routing features.

33. A method for updating said subscriber database according to claim 30, wherein said options to modify said group record comprise a request to modify said access identification number in accordance with a new access identification number inputted by said subscriber.

* * * * *